(12) United States Patent
Yi et al.

(10) Patent No.: US 10,895,905 B2
(45) Date of Patent: Jan. 19, 2021

(54) STORAGE CONTROLLER, STORAGE DEVICE INCLUDING THE SAME, AND OPERATION METHOD OF STORAGE CONTROLLER

(71) Applicant: SAMSUNG ELECTRONICS CO., LTD., Suwon-si (KR)

(72) Inventors: Hyun Ju Yi, Hwaseong-si (KR); Jaeho Sim, Seoul (KR); Kicheol Eom, Seoul (KR); Dong-Ryoul Lee, Incheon (KR); Hyotaek Leem, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 183 days.

(21) Appl. No.: 16/055,197

(22) Filed: Aug. 6, 2018

(65) Prior Publication Data
US 2019/0187774 A1  Jun. 20, 2019

(30) Foreign Application Priority Data
Dec. 18, 2017  (KR) .......................... 10-2017-0174347

(51) Int. Cl.
| | |
|---|---|
| G11C 16/32 | (2006.01) |
| G06F 1/3234 | (2019.01) |
| G11C 16/30 | (2006.01) |
| G11C 5/14 | (2006.01) |
| G06F 13/16 | (2006.01) |
| G06F 13/42 | (2006.01) |

(52) U.S. Cl.
CPC ........ *G06F 1/3275* (2013.01); *G06F 13/1689* (2013.01); *G06F 13/4243* (2013.01); *G06F 13/4273* (2013.01); *G11C 5/14* (2013.01); *G11C 16/30* (2013.01); *G11C 16/32* (2013.01)

(58) Field of Classification Search
CPC ......................................................... G06F 1/32
See application file for complete search history.

(56) References Cited

U.S. PATENT DOCUMENTS

| | | | |
|---|---|---|---|
| 7,523,282 | B1 | 4/2009 | Kapil et al. |
| 8,359,485 | B2 | 1/2013 | Oh |
| 8,918,669 | B2 | 12/2014 | Ware et al. |
| 2007/0174508 | A1 | 7/2007 | King et al. |

(Continued)

FOREIGN PATENT DOCUMENTS

| | | |
|---|---|---|
| JP | 2003067691 A | 3/2003 |
| KR | 0878527 | 1/2009 |
| WO | WO 2014143056 A1 | 9/2014 |

*Primary Examiner* — Kim Huynh
*Assistant Examiner* — Eric Chang
(74) *Attorney, Agent, or Firm* — Volentine, Whitt & Francos, PLLC

(57) ABSTRACT

A storage controller communicates with an external device including a submission queue and a completion queue. An operation method of the storage controller includes receiving a notification associated with a command from the external device, based on a first clock, fetching the command from the submission queue, based on a second clock, performing an operation corresponding to the fetched command, based on a third clock, writing completion information to the completion queue, based on a fourth clock, and transmitting an interrupt signal to the external device, based on a fifth clock. Each of the first clock to the fifth clock is selectively activated depending on each operation phase.

19 Claims, 19 Drawing Sheets

(56) References Cited

U.S. PATENT DOCUMENTS

| | | |
|---|---|---|
| 2009/0115469 A1 | 5/2009 | Cortadella et al. |
| 2010/0169687 A1 | 7/2010 | Kimura |
| 2011/0235459 A1* | 9/2011 | Ware .................... G11C 7/1066 365/233.11 |
| 2011/0296222 A1 | 12/2011 | Tan et al. |
| 2012/0210157 A1 | 8/2012 | Wang |
| 2014/0082269 A1 | 3/2014 | Kang et al. |
| 2016/0109928 A1 | 4/2016 | He et al. |
| 2016/0132237 A1 | 5/2016 | Jeong et al. |

\* cited by examiner

STORAGE CONTROLLER, STORAGE DEVICE INCLUDING THE SAME, AND OPERATION METHOD OF STORAGE CONTROLLER

CROSS-REFERENCE TO RELATED APPLICATIONS

This U.S. non-provisional patent application claims priority under 35 U.S.C. § 119 to Korean Patent Application No. 10-2017-0174347, filed on Dec. 18, 2017 in the Korean Intellectual Property Office, the disclosures of which are incorporated by reference herein in their entireties.

BACKGROUND

1. Technical Field

Embodiments of the present disclosure disclosed herein relate to a semiconductor memory. More particularly, the present disclosure relates to a storage controller for a semiconductor memory, and an operation method of the storage controller.

2. Description of the Related Art

Semiconductor memory devices are classified into volatile memory devices and nonvolatile memory devices. Volatile memory devices lose data stored therein at power-off, and include a static random access memory (SRAM), a dynamic RAM (DRAM), a synchronous DRAM (SDRAM), and the like. Nonvolatile memory devices retain data stored therein even at power-off, and include a read only memory (ROM), a programmable ROM (PROM), an electrically programmable ROM (EPROM), an electrically erasable and programmable ROM (EEPROM), a flash memory device, a phase-change RAM (PRAM), a magnetic RAM (MRAM), a resistive RAM (RRAM), a ferroelectric RAM (FRAM), and the like.

The flash memory is being widely used as a mass storage medium. A flash memory-based mass storage medium may include a control device for controlling a flash memory. The control device operates based on a clock signal, in general. For example, the control device may include various intellectual property (IP) blocks, which operate based on an input clock. As the term is used herein, an intellectual property block may be a unit of logic, a cell or an integrated circuit that may be reusable and may be subject to intellectual property of a single party as a unique unit of logic, cell or integrated circuit. The clock provided to the various intellectual property blocks is a major factor of power consumption. For this reason, there are being developed various techniques for reducing power consumption relating to the clock.

SUMMARY

Embodiments of the present disclosure provide a storage controller with power consumption reduced by selectively controlling a clock to be provided to each intellectual property block based on (depending on) operation states of the intellectual property blocks, a storage device including the same, and an operation method of the storage controller.

According to an exemplary embodiment, a storage controller communicates with an external device including a submission queue and a completion queue. An operation method of the storage controller includes operation phases including receiving a notification associated with a command from the external device, based on a first clock; fetching the command from the submission queue, based on a second clock; performing an operation corresponding to the fetched command, based on a third clock; writing completion information to the completion queue, based on a fourth clock; and transmitting an interrupt signal to the external device, based on a fifth clock. Each of the first clock to the fifth clock is selectively activated depending on each operation phase of the method.

According to an exemplary embodiment, a storage controller includes a physical layer that communicates with an external device; an NVMe control unit that is connected with the physical layer through a system bus; and a clock managing unit that selectively activates or deactivates each of a first clock to a fifth clock depending on an operation of the NVMe control unit. The NVMe control unit includes a control register block that receives information from the external device, based on the first clock; a command fetch block that fetches a command from the external device, based on the second clock; a direct memory access (DMA) engine that performs a DMA operation with the external device, based on the third clock; a completion block that writes completion information to the external device, based on the fourth clock; and an interrupt block that transmits an interrupt signal to the external device, based on the fifth clock.

According to an exemplary embodiment, a storage device includes multiple nonvolatile memory devices, and a storage controller that controls the multiple nonvolatile memory devices. The storage controller includes an NVMe control unit and a clock managing unit. Based on multiple clocks, the NVMe control unit fetches a command from an external device, executes an operation corresponding to the fetched command, transmits completion information about the operation to the external device, and transmits an interrupt signal to the external device. The clock managing unit selectively activates or deactivates each of the multiple clocks depending on an operation state of the NVMe control unit.

BRIEF DESCRIPTION OF THE FIGURES

The above and other objects and features of the present disclosure will become apparent by describing in detail exemplary embodiments thereof with reference to the accompanying drawings.

DETAILED DESCRIPTION

Below, embodiments of the present disclosure may be described in detail and clearly to such an extent that an ordinary one in the art easily implements the present disclosure.

Below, terms such as "block", "unit", "module", "driver", "circuit", etc. which describe an element illustrated in drawings, and which performs a specific function or includes a specific function, may be implemented by or in the form of software, hardware, or a combination thereof.

Figure 1:
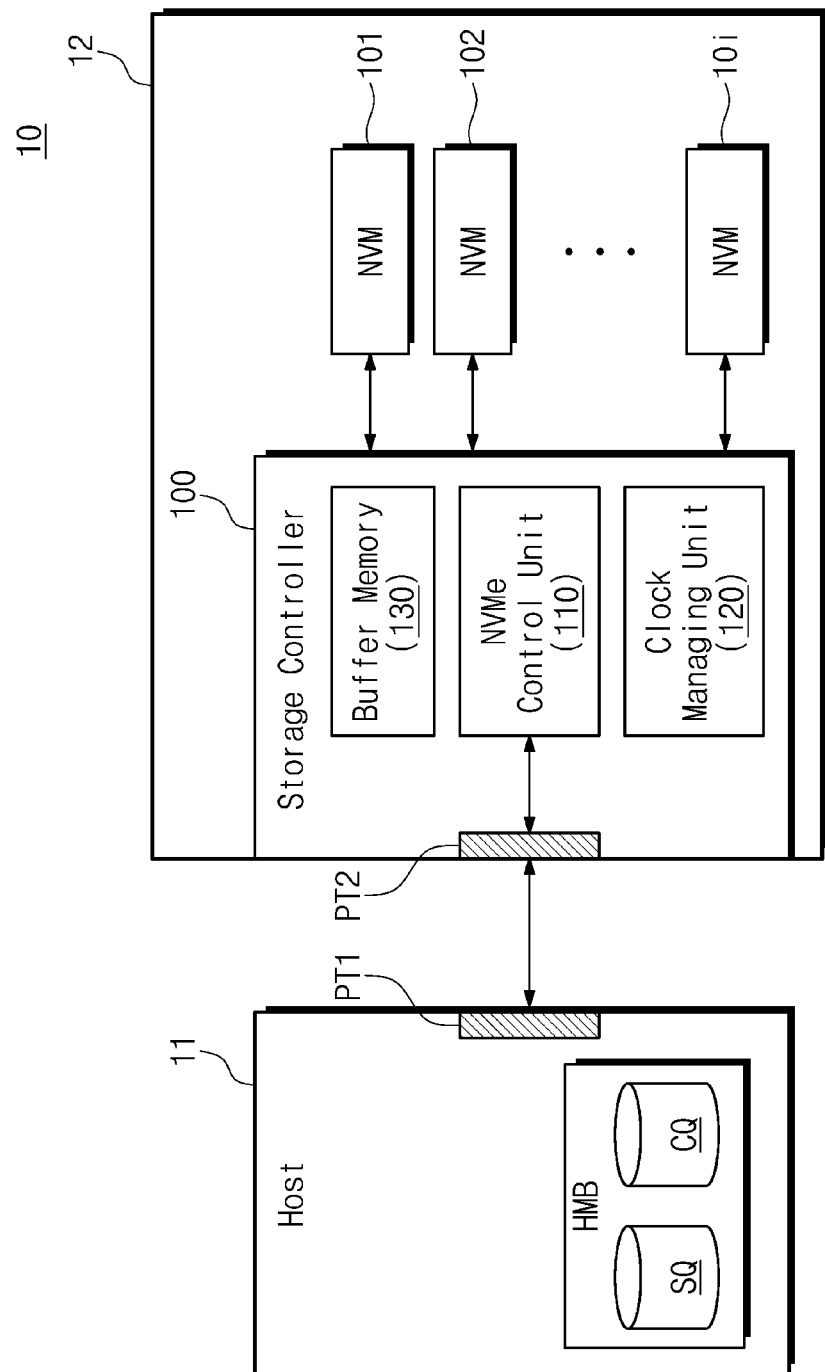
FIG. 1 is a block diagram illustrating a storage system according to an embodiment of the present disclosure.

FIG. 1 is a block diagram illustrating a storage system 10 according to an embodiment of the present disclosure. Referring to FIG. 1, the storage system 10 may include a host 11 and a storage device 12. The storage device may be defined by a single, comprehensive, integral housing that includes therein tangible elements as shown in FIG. 1 and other figures, and as described herein The host 11 may store data in the storage device 12 or may read data stored in the storage device 12. The host 11 may communicate with the storage device 12 through a first port PT1. In an embodiment, the first port PT1 may be a physical port that is based on a PCIe (Peripheral Component Interconnect Express) protocol. However, the present disclosure is not limited thereto.

Below, to describe the technical feature(s) of the present disclosure briefly, it is assumed that the host 11 and the storage device 12 communicate with each other through a PCIe protocol-based physical port such as the first port PT1 and second port PT2. Also, it is assumed that the storage device 12 is an NVMe (Nonvolatile Memory express) device that operates based on an NVMe interface. However, the present disclosure is not limited thereto.

The host 11 may include a host memory buffer HMB. The host memory buffer HMB may include a submission queue SQ and a completion queue CQ. The submission queue SQ may be storage such as dedicated storage that stores a command to be provided to the storage device 12. The completion queue CQ may be storage such as dedicated storage that stores completion information about an operation completed in the storage device 12 based on the command.

The storage device 12 may include a storage controller 100 and multiple nonvolatile memory devices 101 to 10i. In an embodiment, the storage controller 100 may be an NVMe device operating based on the NVMe interface, as described above. That is, the storage controller 100 may be configured to communicate with the host 11 in a predefined manner that is based on the NVMe interface.

In the descriptions herein, reference is made to a variety of controllers (e.g., a storage controller 100), units (e.g., an NVMe control unit 110 described below), and blocks (e.g., an intellectual property block). Any of these controllers, units and blocks may be embodied by a processor that executes a particular dedicated set of software instructions, such as a software module. The processor executes the instructions to control operations of the controller(s), unit(s) and/or blocks. Multiple of the controllers, units and blocks may be defined by a single common processor and different dedicated sets of software instructions. Any processor of a controller, unit or block described herein is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. A processor is an article of manufacture and/or a machine component. A processor is configured to execute software instructions in order to perform functions as described in the various embodiments herein. A processor may be a general-purpose processor or may be part of an application specific integrated circuit (ASIC). A processor may also be a microprocessor, a microcomputer, a processor chip, a controller, a microcontroller, a digital signal processor (DSP), a state machine, or a programmable logic device. A processor may also be a logical circuit, including a programmable gate array (PGA) such as a field programmable gate array (FPGA), or another type of circuit that includes discrete gate and/or transistor logic. A processor may be a central processing unit (CPU), a graphics processing unit (GPU), or both. Additionally, any processor described herein may include multiple processors, parallel processors, or both. Multiple processors may be included in, or coupled to, a single device or multiple devices. Sets of instructions can be read from a computer-readable medium. Further, the instructions, when executed by a processor, can be used to perform one or more of the methods and processes as described herein. In a particular embodiment, the instructions may reside completely, or at least partially, within a main memory, a static memory, and/or within a processor during execution.

In an alternative embodiment, dedicated hardware implementations, such as application-specific integrated circuits (ASICs), programmable logic arrays and other hardware components, can be constructed to implement one or more of the controller(s), unit(s) and/or block(s) described herein. One or more embodiments described herein may implement functions using two or more specific interconnected hardware modules or devices with related control and data signals that can be communicated between and through the modules. Accordingly, the present disclosure encompasses software, firmware, and hardware implementations. Nothing in the present application should be interpreted as being implemented or implementable solely with software and not hardware such as a tangible non-transitory processor and/or memory.

A storage controller 100 may be implemented with a circuit, with a processor that executes software instructions, or a combination of a circuit and a processor that executes instructions. The nonvolatile memory devices 101 to 10i may operate under control of the storage controller 100. In an embodiment, each of the nonvolatile memory devices 101 to 10i may be a NAND flash memory device, but the nonvolatile memory devices of the present disclosure are not limited thereto.

The storage controller 100 may include an NVMe control unit 110, a clock managing unit 120, and a buffer memory 130. The NVMe control unit 110 may be configured to analyze or interpret various signals provided from the host 11 through the second port PT2 and to perform an operation corresponding to the analyzed or interpreted result. In an embodiment, the NVMe control unit 110 may include various function blocks (or intellectual property (IP) blocks) for performing the above-described operations. As described previously, any of a controller, a unit, and a block (which includes a function block and an intellectual property block) may be implemented with a circuit, with a processor that executes instructions, or a combination of a circuit and a processor that executes instructions. In embodiments, a function block or multiple function blocks of the NVMe control unit 110 may include a memory that stores instructions and a processor that executes the instructions. The clock managing unit 120 may be configured to manage various clocks that are used in the storage controller 100. For example, the clock managing unit 120 may provide multiple clocks to the NVMe control unit 110. The multiple clocks may be provided to the multiple function blocks included in the NVMe control unit 110, respectively.

In an embodiment, the clock managing unit 120 may control or manage a clock to be provided to each function block, depending on an operation state of each of the multiple function blocks included in the NVMe control unit 110. Control may include affirmatively providing or not providing a clock, based on determining or recognizing an operation state of a function block.

For example, the NVMe control unit 110 may include a command fetch block configured to fetch a command from the submission queue SQ of the host 11. The clock managing unit 120 may provide a clock to the command fetch block while the command fetch block fetches the command from the submission queue SQ. After the command fetch block completes a command fetch operation, the clock managing unit 120 may block or deactivate the clock being provided to the command fetch block. Below, an operation of the clock managing unit 120 according to the present disclosure will be more fully described with reference to accompanying drawings.

In an embodiment, the clock managing unit 120 is illustrated in FIG. 1 as being separate from the NVMe control unit 110. However, clock managing units of the present disclosure are not limited thereto. For example, the clock managing unit 120 may be included in the NVMe control unit 110.

The buffer memory 130 may be configured to store write data provided from the host 11 or read data provided from the multiple nonvolatile memory devices 101 to 10i. In an alternative embodiment, the buffer memory 130 may be placed outside the storage controller 100.

As described above, the storage controller 100 according to the present disclosure may provide a clock only to a function block which is performing a relevant operation, depending on operation states of internal function blocks. In other words, the storage controller 100 according to the present disclosure may not provide a clock to function blocks that do not perform an operation (i.e., while they are not performing an operation). Accordingly, since a clock is prevented from being provided unnecessarily or since the whole time to provide a clock decreases, power consumption of the storage device 12 is reduced.

Figure 2:
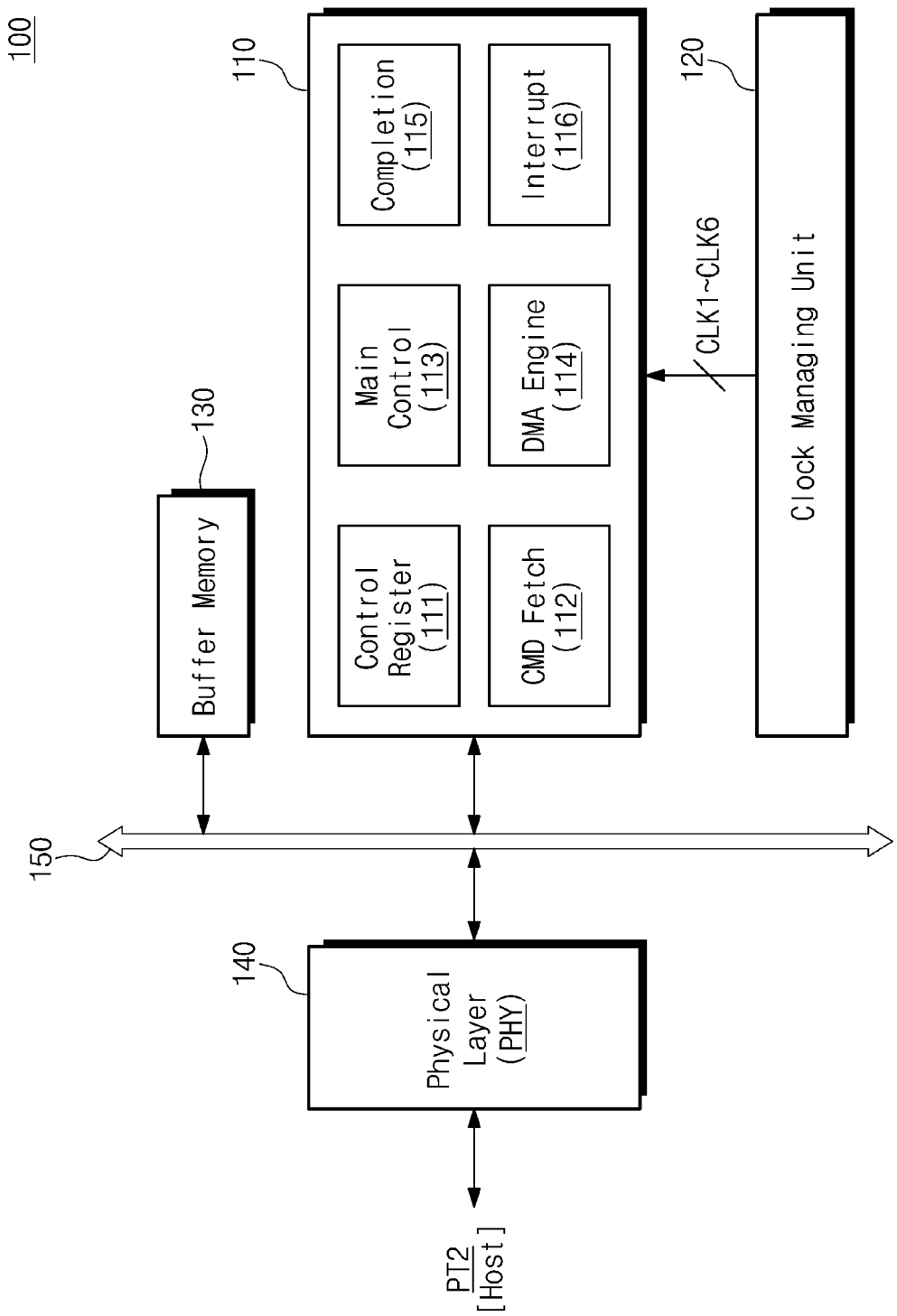
FIG. 2 is a block diagram illustrating a storage controller of the storage system of FIG. 1.

FIG. 2 is a block diagram illustrating the storage controller 100 of FIG. 1. Referring to FIGS. 1 and 2, the storage controller 100 may include the NVMe control unit 110, the clock managing unit 120, the buffer memory 130, a physical layer 140, and a system bus 150. As described above, the storage controller 100 may be an NVMe device that operates based on the NVMe interface. That is, the storage controller 100 may operate according to an NVM specification that defines a NVMe interface. However, the storage controllers of the present disclosure are not limited thereto.

The NVMe control unit 110 may be configured to process a signal input to the physical layer 140 through the system bus 150. For example, the host 11 may be configured to provide information to the physical layer 140 through the second port PT2, and the NVMe control unit 110 may be configured to analyze or interpret the information input to the physical layer 140. The NVMe control unit 110 and the physical layer 140 may communicate with each other through the system bus 150.

The NVMe control unit 110 may include a control register block 111, a command fetch block 112, a main control block 113, a DMA engine block 114 (direct memory access (DMA) engine), a completion block 115, and an interrupt block 116.

The control register block 111 may be configured to include a register capable of being set by the host 11 or to process one or a series of operations for recognizing a register value set by the host 11. For example, the control register block 111 may include various registers for determining information provided from the host 11. The host 11 may notify the NVMe control unit 110 of various information by setting a register value of the control register block 111.

The command fetch block 112 may perform or process one or a series of operations for fetching a command stored in the submission queue SQ of the host 11. For example, the command fetch block 112 may transmit a memory read request to the host 11 and may receive a command stored in the submission queue SQ from the host 11. In other words, a process involving the command fetch block 112 of the NVMe control unit 110 may include transmitting a memory read request to an external device (i.e., the host 11) and receiving the command stored in the submission queue SQ from the external device (i.e., the host 11).

The main control block 113 may control overall operations of the NVMe control unit 110 or may process one or a series of operations to be performed in the NVMe control unit 110. In an embodiment, the main control block 113 may manage or control a DMA operation of the DMA engine block 114.

The DMA engine block 114 may process the DMA operation of exchanging data with the host 11. For example, the DMA engine block 114 may process the DMA operation of receiving write data from the host 11 or transmitting read data to the host 11.

The completion block 115 may process one or a series of operations of writing completion information indicating that an operation is completed, to the completion queue CQ of the host 11. For example, when an operation associated with a command fetched from the host 11 is completed, the completion block 115 may write the completion information indicating that the operation is completed, to the completion queue CQ of the host 11. That is, the completion block 115 may be configured to write completion information to an external device (i.e., to the completion queue CQ of the host 11).

The interrupt block 116 may process one or a series of operations of providing an interrupt signal to the host 11. For example, after the completion block 115 writes the completion information to the completion queue CQ, the interrupt block 116 may notify the host 11 that the completion information is written to the completion queue CQ, by providing the interrupt signal to the host 11. In an embodiment, the interrupt signal may be provided in a signaling manner such as pin-based interrupt, MSI (Message Signaled Interrupts), MSI-X, etc.

As described above, function blocks included in the NVMe control unit 110 may be configured to perform one or a series of operations as described herein. The operation(s) performed by the function blocks may only be some of the operations performed by the NVMe control unit 110 and the storage controller 100. All or a part of the function blocks included in the NVMe control unit 110 may be implemented in the form of software, hardware, or a combination thereof.

The clock managing unit 120 may provide a first clock CLK1 to a sixth clock CLK6 to the NVMe control unit 110. In an embodiment, the first clock CLK1 to the sixth clock CLK6 may be respectively provided to the function blocks of the NVMe control unit 110. In this case, the clock managing unit 120 may control or manage the first clock CLK1 to the sixth clock CLK6 such that only a relevant clock is activated (or provided) depending on an operation state of each of the control register block 111, the command fetch block 112, the main control block 113, the DMA engine block 114, the completion block 115, the interrupt block 116 (i.e., the function blocks of the NVMe control unit 110). A configuration and an operation of the clock managing unit 120 will be more fully described with reference to the following drawings.

The buffer memory 130 may store write data provided from the host 11 or read data provided from the nonvolatile memory devices 101 to 10i. The physical layer 140 may be configured to process a signal received from the host 11 through the second port PT2. In an embodiment, the physical layer 140 may be a PCIe-based physical layer.

The system bus 150 may provide a communication channel between components included in the storage controller 100. The components included in the storage controller 100 may communicate with each other through the system bus 150 or may exchange signals or information with each other through the system bus 150. In an embodiment, the system bus 150 may utilize one of various bus protocols such as AHB (Advanced High-performance Bus), AXI (Advanced eXtensible Interface), AMBA (Advanced Microcontroller Bus Architecture), etc.

Figure 3:
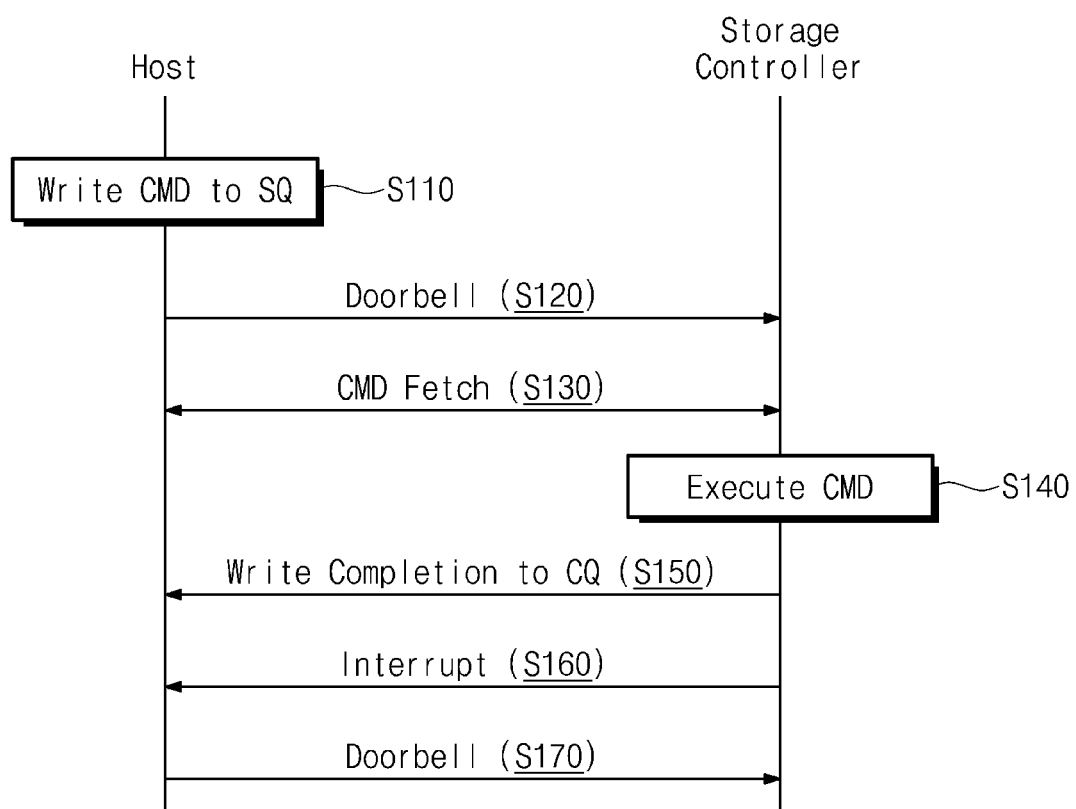
FIG. 3 is a flowchart illustrating an operation of a storage system of FIG. 1.

FIG. 3 is a flowchart illustrating an operation of the storage system 10 of FIG. 1. In an embodiment, to describe the technical idea(s) of the present disclosure easily, an operation method of the storage system 10 for processing one command will be described with reference to FIG. 3. However, the operation method illustrated in FIG. 3 is a general operation method, and the inventive concept(s) of the present disclosure are not limited thereto.

Referring to FIGS. 1 to 3, in operation S110, the host 11 may write a command CMD to the submission queue SQ. For example, the host 11 may write, to the submission queue SQ, a write command for storing data to the storage device 12, a read command for reading data from the storage device 12, or various commands for controlling the storage device 12, such as a flush command, an erase command, etc.

In operation S120, the host 11 may provide a doorbell to the storage controller 100. For example, the host 11 may notify the storage controller 100 that a new command CMD is written to the submission queue SQ, by setting a new value to a door bell register included in the control register block 111 through the signaling manner. In other words, a notification associated with a command from an external device (i.e. the host 11) may be a notification received through doorbell signaling from the external device (i.e., the host 11).

In operation S130, the storage controller 100 may fetch the command CMD written to the submission queue SQ. For example, the storage controller 100 may recognize that the new command CMD is stored in the submission queue SQ, in response to the doorbell. In response to the recognized result, the command fetch block 112 of the NVMe control unit 110 in the storage controller 100 may fetch the command CMD written to the submission queue SQ.

In operation S140, the storage controller 100 may perform an operation corresponding to the fetched command CMD. For example, when the fetched command CMD is a write command, the storage controller 100 may receive write data from the host 11 and may store the received write data in the buffer memory 130 or the nonvolatile memory devices 101 to 10i. Alternatively, when the fetched command CMD is a read command, the storage controller 100 may transmit read data from the nonvolatile memory devices 101 to 10i to the host 11.

After the operation corresponding to the fetched command CMD is performed, in operation S150, the storage controller 100 may write completion information to the completion queue CQ. For example, the completion block 115 may write the completion information indicating that the operation associated with the fetched command CMD is completed, to the completion queue CQ of the host 11.

In operation S160, the storage controller 100 may transmit an interrupt signal to the host 11. For example, the interrupt block 116 of the storage controller 100 may transmit, to the host 11, the interrupt signal for providing notification that the completion information is written to the completion queue CQ.

In operation S170, the host 11 may provide the storage controller 100 with a doorbell for providing notification that the completion information written to the completion queue CQ is checked.

The host 11 and the storage controller 100 according to an embodiment of the present disclosure may perform various operations depending on the operation method above described. In this case, the clock managing unit 120 of the storage controller 100 may control the multiple clocks CLK1 to CLK6 such that a clock is provided only to a function block operating in each phase.

Figure 4:
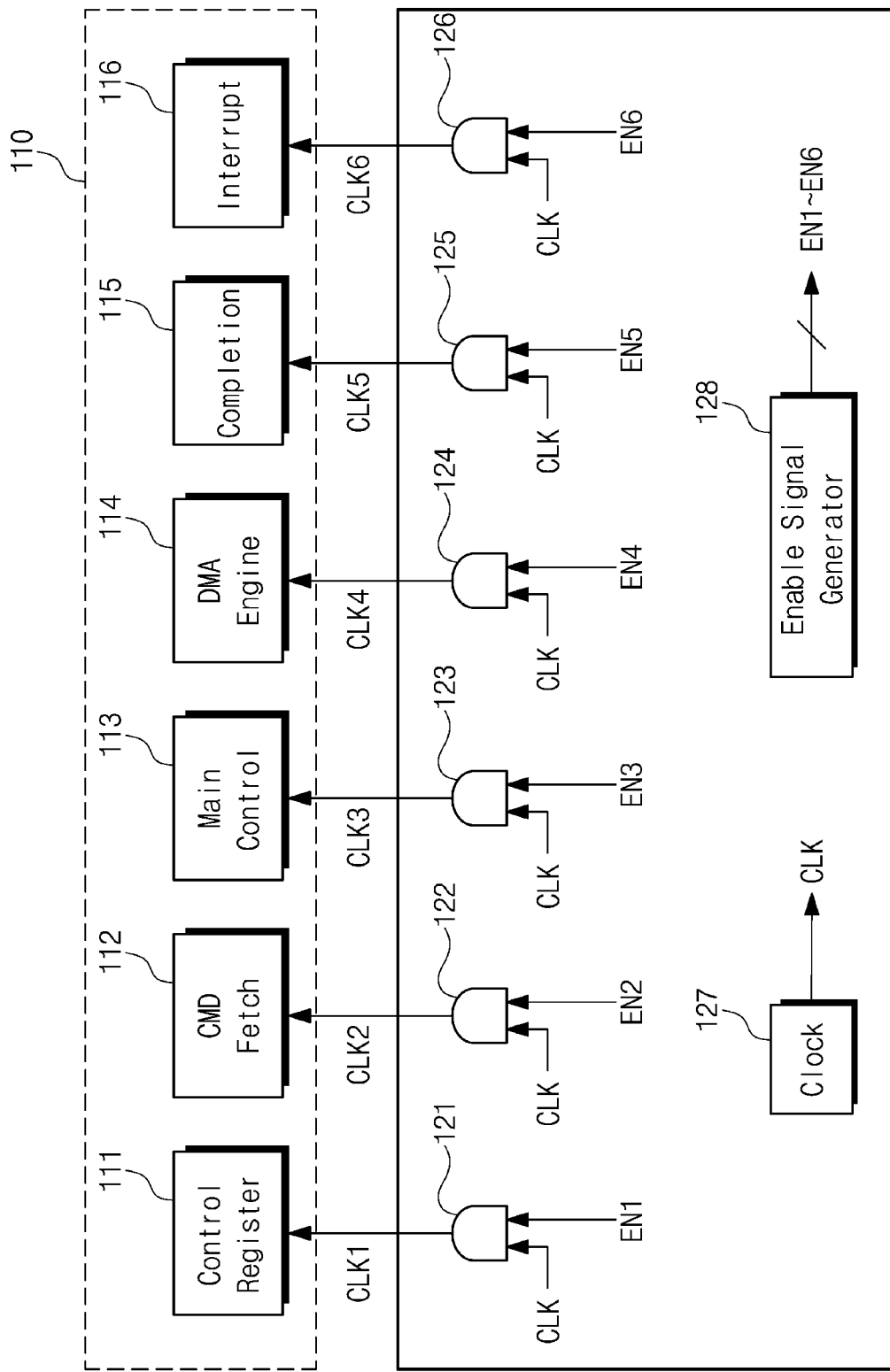
FIG. 4 is a block diagram illustrating an NVMe control unit and a clock managing unit of the storage controller of FIG. 2.

FIG. 4 is a block diagram illustrating the NVMe control unit 110 and the clock managing unit 120 of FIG. 2. For a brief description, components that are unnecessary to describe an operation of the clock managing unit 120 are omitted.

Referring to FIGS. 2 to 4, the NVMe control unit 110 may include the control register block 111, the command fetch block 112, the main control block 113, the DMA engine block 114, the completion block 115, and the interrupt block 116. The NVMe control unit 110 and the components of the NVMe control unit 110 are described with reference to FIG. 2, and thus, a detailed description thereof will not be repeated here.

The clock managing unit 120 may include first AND gate 121 to sixth AND gate 126, a clock generator 127, and an enable signal generator 128. A reference clock CLK may be applied in common to the first AND gate 121 to sixth AND gate 126, and first enable signal EN1 to sixth enable signal EN6 may be respectively applied to the first AND gate 121 to sixth AND gate 126. The first AND gate 121 to sixth AND gate 126 may respectively output the first clock CLkl to the sixth clock CLK6 in response to the received signals.

For example, the first AND gate 121 may output the first clock CLK1 in response to the reference clock CLK and the first enable signal EN1. When the first enable signal EN1 is activated (e.g., when the first enable signal EN1 is logical high), the first clock CLK1 may be output in the same form as the reference clock CLK; when the first enable signal EN1 is deactivated (e.g., when the first enable signal EN1 is logical low), the first clock CLK1 may be deactivated (or may be logical low). That is, the first clock CLK1 may be activated or deactivated depending on the first enable signal EN1.

Likewise, the second to sixth AND gates 122 to 126 may respectively output the second and sixth clocks CLK2 to CLK6 in response to the reference clock CLK and the second to sixth enable signals EN2 to EN6.

The first clock CLK1 to sixth clock CLK6 from the first AND gate 121 to sixth AND gate 126 may be respectively provided to the control register block 111, the command fetch block 112, the main control block 113, the DMA engine block 114, the completion block 115, the interrupt block 116 (i.e., the function blocks of the NVMe control unit 110). For example, the first clock CLK1 may be provided to the control register block 111, and the control register block 111 may operate based on the first clock CLK1. The first clock may thus be activated by the clock managing unit 120 while the NVMe control unit 110 (the control register block 111) performs the corresponding operation. The second clock CLK2 may be provided to the command fetch block 112, and the command fetch block 112 may operate based on the second clock CLK2. The second clock may thus be activated by the clock managing unit 120 while the NVMe control unit 110 (the command fetch block 112) performs the corresponding operation. The third clock CLK3 may be provided to the main control block 113, and the main control block 113 may operate based on the third clock CLK3. The third clock may thus be activated by the clock managing unit 120 while the NVMe control unit 110 (the main control block 113) performs the corresponding operation. The fourth clock CLK4 may be provided to the DMA engine block 114, and the DMA engine block 114 may operate based on the fourth clock CLK4. The fourth clock may thus be activated by the clock managing unit 120 while the NVMe control unit 110 (the DMA engine block 114) performs the corresponding operation. The fifth clock CLK5 may be provided to the completion block 115, and the completion block 115 may operate based on the fifth clock CLK5. The fifth clock may thus be activated by the clock managing unit 120 while the NVMe control unit 110 (the completion block 115) performs the corresponding operation. The sixth clock CLK6 may be provided to the interrupt block 116, and the interrupt block 116 may operate based on the sixth clock CLK6. The sixth clock may thus be activated by the clock managing unit 120 while the NVMe control unit 110 (the interrupt block 116) performs the corresponding operation.

The clock generator 127 may generate the reference clock CLK. In an embodiment, the clock generator 127 may be omitted, and in this case, the reference clock CLK may be provided from an external device (e.g., a separate clock generator or the host 11).

The enable signal generator 128 may generate the first enable signal EN1 to sixth enable signal EN6 depending on operation states of the control register block 111, the command fetch block 112, the main control block 113, the DMA engine block 114, the completion block 115, the interrupt block 116 (i.e., the function blocks of the NVMe control unit 110). For example, while the command CMD is fetched from the submission queue SQ by the command fetch block 112 (in other words, while the command fetch block 112 operates), the enable signal generator 128 may generate the second enable signal EN2 such that the second clock CLK2 to be provided to the command fetch block 112 is activated. Likewise, while the completion information is written to the completion queue CQ by the completion block 115 (in other words, while the completion block 115 operates), the enable signal generator 128 may generate the fifth enable signal EN5 such that the fifth clock CLK5 to be provided to the completion block 115 is activated.

In an embodiment, the enable signal generator 128 may detect information exchanged through the system bus 150 and may generate the first enable signal EN1 to sixth enable signal EN6 based on the detected information. Alternatively, the enable signal generator 128 may generate the first enable signal EN1 to sixth enable signal EN6 depending on a predefined manner.

In an embodiment, the configurations of the NVMe control unit 110 and the clock managing unit 120 illustrated in FIG. 4 are exemplary, and NVMe control units and clock managing units compatible with teachings of the present disclosure are not limited thereto. For example, the NVMe control unit 110 may further include any other function blocks in addition to the function blocks illustrated in FIG. 4, and the clock managing unit 120 may be configured to provide different clocks depending on operation states of the other function blocks.

Figure 5:
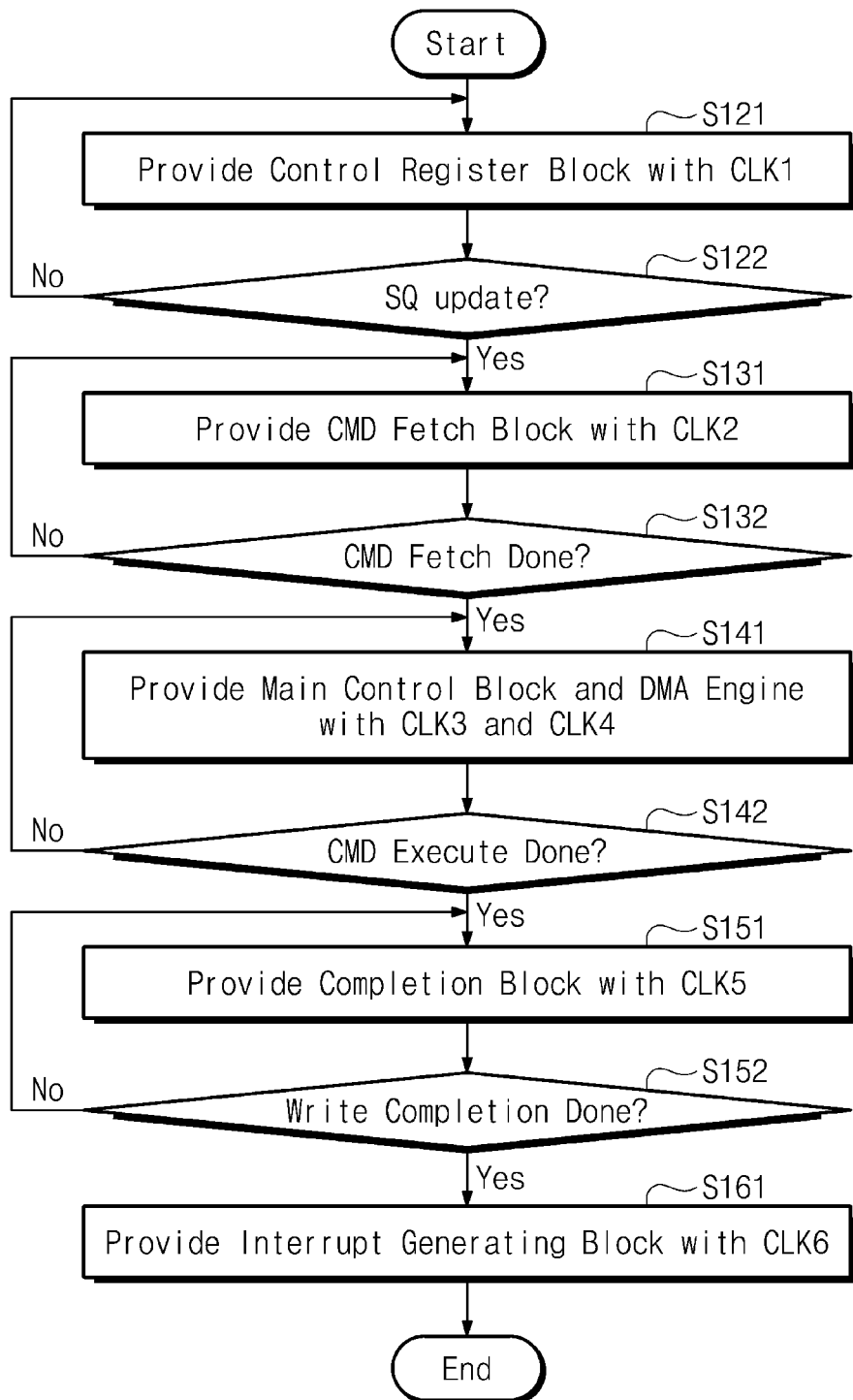
FIG. 5 is a flowchart illustrating an operation of the clock managing unit of FIG. 4.

FIG. 5 is a flowchart illustrating an operation of the clock managing unit 120 of FIG. 4. Referring to FIGS. 4 and 5, in operation S121, the clock managing unit 120 may provide the control register block 111 with the first clock CLK1. For example, the clock managing unit 120 may provide the first clock CLK1 to the control register block 111 by activating the first enable signal EN1.

In operation S122, the clock managing unit 120 may determine whether the submission queue SQ is updated. When the submission queue SQ is not updated (i.e., when separate doorbell signaling from the host 11 does not exist), the clock managing unit 120 continues to perform operation S121. That is, in the case where the submission queue SQ is not updated (i.e., when separate doorbell signaling from the host 11 does not exist), the clock managing unit 120 may continue to provide the first clock CLK1 to the control register block 111. In an embodiment, operation S121 and operation S122 may be included in or correspond to operation S120 of FIG. 3.

When the submission queue SQ is updated, in operation S131, the clock managing unit 120 may provide the command fetch block 112 with the second clock CLK2. The command fetch block 112 may process one or a series of operations of fetching the command CMD from the submission queue SQ by using the second clock CLK2. In an embodiment, when the submission queue SQ is updated, the clock managing unit 120 may block or deactivate the first clock CLK1 that is provided to the control register block 111.

In operation S132, the clock managing unit 120 may determine whether the command CMD is completely fetched. When the command CMD is not completely fetched, the clock managing unit 120 performs operation S131. In an embodiment, operation S131 and operation S132 may be included in or correspond to operation S130 of FIG. 3.

When the command CMD is completely fetched, in operation S141, the clock managing unit 120 may provide the main control block 113 and the DMA engine block 114 with the third clock CLK3 and the fourth clock CLK4, respectively. The main control block 113 and the DMA engine block 114 may perform an operation corresponding to the fetched command, based on the third clock CLK3 and the fourth clock CLK4. In an embodiment, when the command CMD is completely fetched, the clock managing unit 120 may block or deactivate the second clock CLK2 that is provided to the command fetch block 112.

In operation S142, the clock managing unit 120 may determine whether the operation corresponding to the fetched command CMD is completed. When the operation corresponding to the fetched command CMD is not completed, the clock managing unit 120 performs operation S141. In an embodiment, operation S141 and operation S142 may be include in or correspond to operation S140 of FIG. 3.

When the operation corresponding to the fetched command CMD is completed, the clock managing unit 120 may provide the completion block 115 with the fifth clock CLK5. The completion block 115 may process one or a series of operations of writing completion information to the completion queue CQ, based on the fifth clock CLK5. In an embodiment, when the operation corresponding to the fetched command CMD is completed, the clock managing unit 120 may block or deactivate the third clock CLK3 and the fourth clock CLK4 that are provided to the main control block 113 and the DMA engine block 114.

In operation S152, the clock managing unit 120 may determine whether the completion information is completely written. When the completion information is not completely written, the clock managing unit 120 performs operation S151. In an embodiment, operation S151 and operation S152 may be included in or correspond to operation S150 of FIG. 3.

When the completion information is completely written, in operation S161, the clock managing unit 120 may provide the interrupt block 116 with the sixth clock CLK6. The interrupt block 116 may transmit an interrupt signal to the host 11, based on the sixth clock CLK6. In an embodiment, when the completion information is completely written, the clock managing unit 120 may block or deactivate the fifth clock CLK5 that is provided to the completion block 115.

Although not illustrated in FIG. 5, after the interrupt block 116 transmits the interrupt signal to the host 11, the clock managing unit 120 may block or deactivate the sixth clock CLK6 that is provided to the interrupt block 116 and may provide the control register block 111 with the first clock CLK1.

In an embodiment, operation S122, operation S132, operation S142, and operation S152 may be performed based on information provided through a separate signal line or may be performed based on information provided through the system bus 150. Alternatively, the clock managing unit 120 may determine whether an operation corresponding to each step is completed, based on a predefined time.

Figure 6:
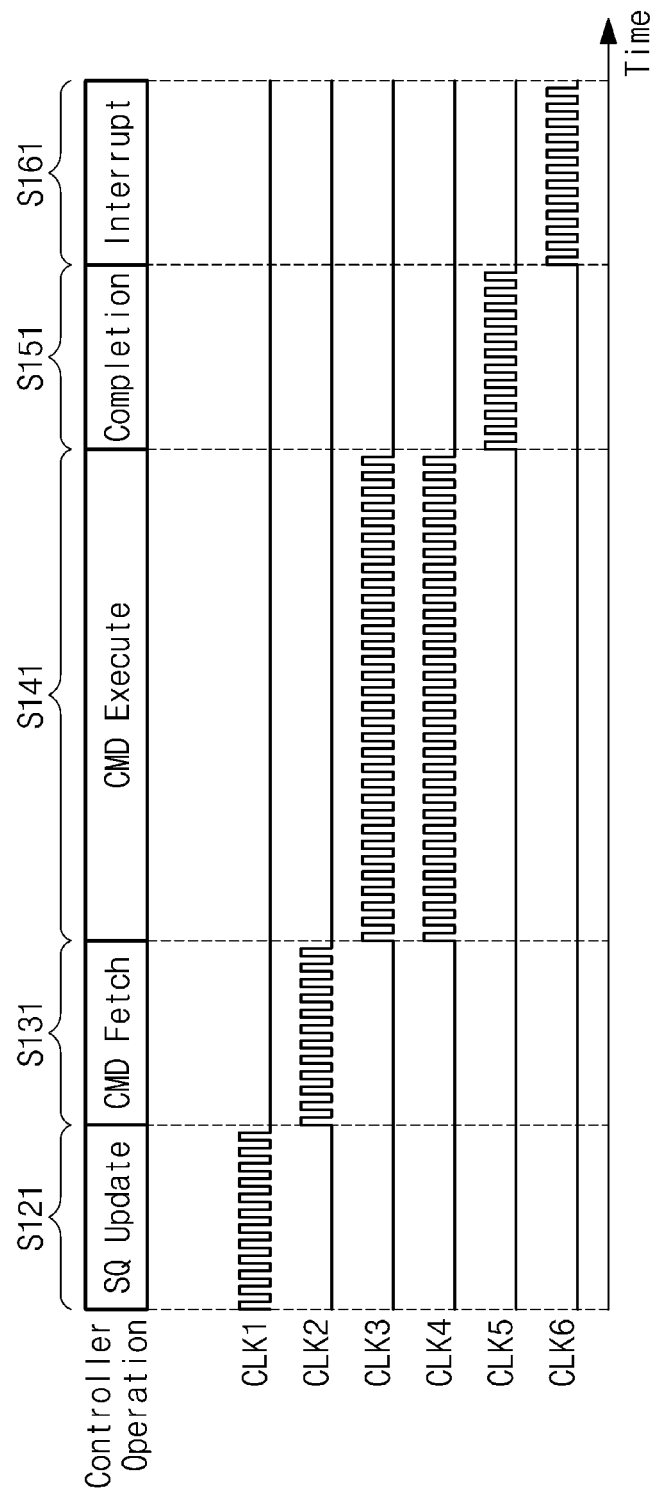
FIG. 6 is a timing diagram illustrating a first clock to a sixth clock provided according to an operation method of FIG. 5.

FIG. 6 is a timing diagram illustrating the first clock CLK1 to the sixth clock CLK6 provided according to the operation method of FIG. 5. For brevity of illustration and convenience of description, components that are unnecessary to describe an embodiment of the present disclosure are omitted.

Referring to FIGS. 4 to 6, the first clock CLK1 may be activated in a submission queue (SQ) update period. As illustrated in FIG. 4, the first clock CLK1 is provided to the control register block 111. That is, the control register block 111 may operate based on the activated first clock CLK1 during the submission queue update period. The submission queue update period may correspond to operation S121 of FIG. 5.

Next, the second clock CLK2 may be activated during a command fetch period. As illustrated in FIG. 4, the second clock CLK2 is provided to the command fetch block 112. That is, during the command fetch period, the command fetch block 112 may fetch the command CMD from the submission queue SQ, based on the activated second clock CLK2. The command fetch period may correspond to operation S131 of FIG. 5.

During a command execution period, the third and fourth clocks CLK3 and CLK4 may be activated. As illustrated in FIG. 4, the third clock CLK3 is provided to the main control block 113, and the fourth clock CLK4 is provided to the DMA engine block 114. That is, during the command execute period, the main control block 113 and the DMA engine block 114 may perform an operation corresponding to the fetched command CMD, based on the activated third and fourth clocks CLK3 and CLK4. The command execution period may correspond to operation S141 of FIG. 5. In the context of embodiments described above, the DMA engine block 114 may transmit a write DMA request to an external device (i.e., to the host 11) when the fetched command CMD is a write command, and perform a write DMA operation for write data with the external device (i.e., the host 11). Alternatively, the DMA engine block 114 may transmit a read DMA request to an external device (i.e., to the host 11) when the fetched command CMD is a read command, and perform a read DMA operation for read data with the external device (i.e., the host 11).

The fifth clock CLK5 may be activated during a completion period. As illustrated in FIG. 4, the fifth clock CLK5 is provided to the completion block 115. That is, during the completion period, the completion block 115 may process one or a series of operations of writing completion information to the completion queue CQ, based on the activated fifth clock CLK5. The completion period may correspond to operation S151 of FIG. 5.

The sixth clock CLK6 may be activated during an interrupt period. As illustrated in FIG. 4, the sixth clock CLK6 is provided to the interrupt block 116. That is, during the interrupt period, the interrupt block 116 may transmit an interrupt signal to the host 11, based on the activated sixth clock CLK6.

Although not illustrated in FIG. 6, when the main control block 113 is configured to control overall operations of the NVMe control unit 110, the third clock CLK3 may be activated in each operation period.

As illustrated in FIG. 6, in each operation period, only a clock corresponding to each operation period may be activated. For example, during the command fetch period, only the second clock CLK2 to be provided to the command fetch block 112 may be activated, and the remaining clocks CLK1 and CLK3 to CLK6 may be deactivated. In other words, the first clock CLK1 to the sixth clock CLK6 may be used to perform different operations and may not be activated to overlap each other. As a reminder, power consumption is reduced when any clock is not activated, i.e., compared to when the clock is activated. Alternatively, each clock may be selectively activated depending on each operation period or an operation state of each function block. As such, since clocks that would otherwise be provided to function blocks are deactivated in each operation period when the function blocks are not performing an operation, the whole power consumption of the storage device 12 is reduced. When function blocks are deactivated in each operation period when not performing an operation and when unnecessary to perform the operation, the whole power consumption of the storage device 12 is reduced.

Figure 7:
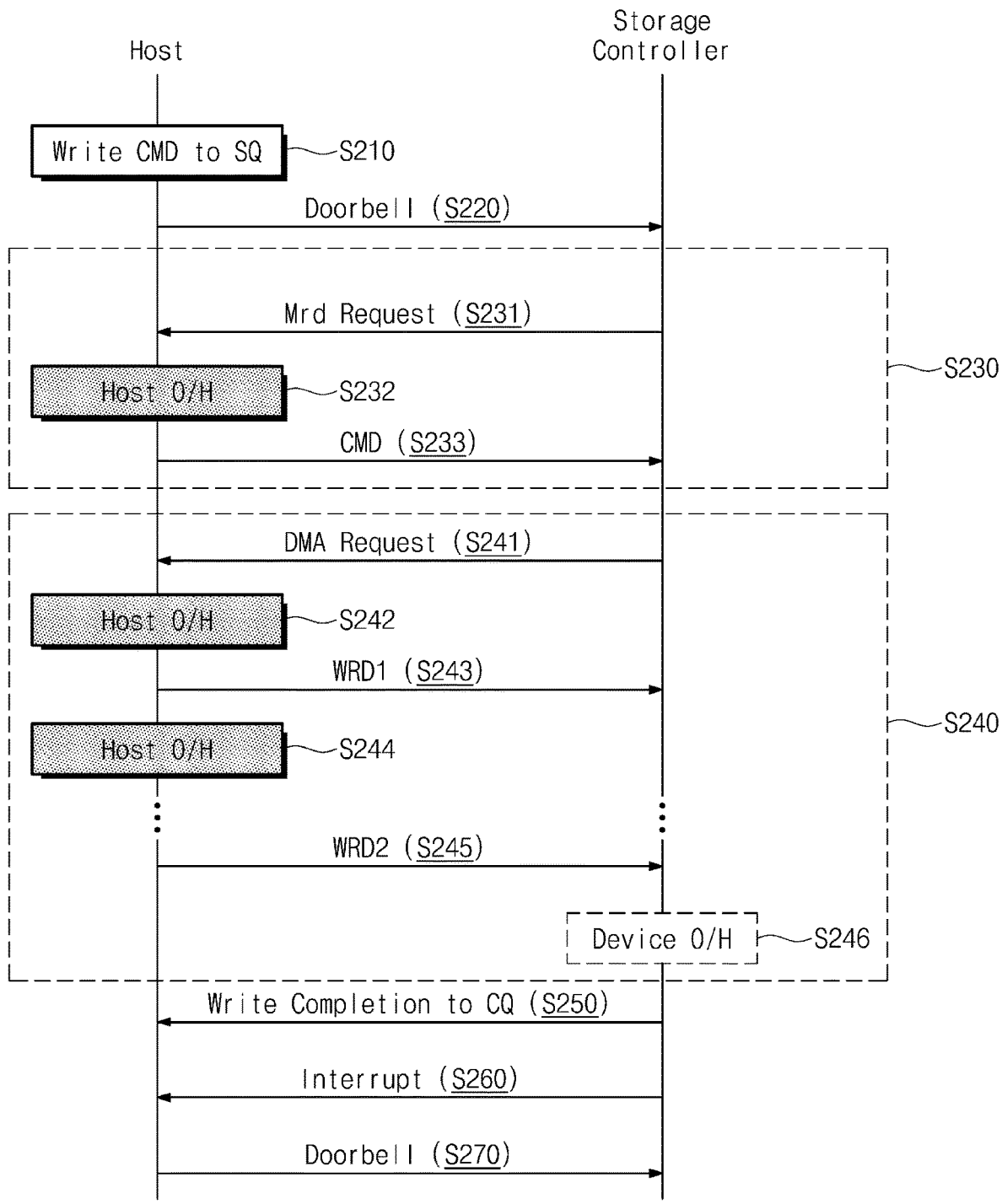
FIG. 7 is a flowchart illustrating an operation of the storage system of FIG. 1.

FIG. 7 is a flowchart illustrating an operation of the storage system 10 of FIG. 1. In an embodiment, a write operation of the storage system 10 will be described with reference to FIG. 7.

Referring to FIGS. 1, 4, and 7, the host 11 may perform operation S210 and operation S220. Operation S210 and operation S220 may be similar to operation S110 and operation S120 of FIG. 3, and thus, a detailed description thereof will not be repeated here.

As the host 11 and the storage controller 100 perform operation S230, the storage controller 100 may fetch the command CMD included in the submission queue SQ. Operation S230 may include operation S231 to operation S233.

In operation S231, the storage controller 100 may transmit a memory read (Mrd) request to the host 11. The memory read request may be a request for reading the command CMD from the submission queue SQ included in the host memory buffer HMB of the host 11. In other words, the DMA engine block 114 may transmit a read DMA request to an external device (i.e., the host 11) and perform a read DMA operation for read data with the external device (i.e., the host 11).

In operation S232, the host 11 may be in an overhead (O/H) state. For example, there may be required a predetermined time for the host 11 to process the received memory read request. Below, for convenience of description, the processing delay time of the host 11 is referred to as a "host overhead". That is, the host overhead state of the host 11 may indicate a state where the host 11 cannot respond to another operation or a specific operation during a predetermined time for the purpose of processing the specific operation. That is, the host 11 may perform the specific operation after the host overhead state.

In operation S233, the host 11 may transmit the command CMD to the storage controller 100 after the host overhead.

In operation S240, the storage controller 100 may perform an operation corresponding to the fetched command CMD. For example, when the fetched command CMD is a write command, the storage controller 100 may perform operation S241 to operation S246.

In operation S241, the storage controller 100 may transmit a DMA request to the host 11. The DMA request may be a DMA request associated with write data stored in the host memory buffer HMB of the host 11. In operation S242, the host 11 may be in the overhead (O/H) state. That is, the host 11 may prepare a DMA operation associated with first write data WRD1 during a predetermined time.

After the host overhead, in operation S243, the host 11 may transmit the first write data WRD1 to the storage controller 100. That is, the host 11 and the storage controller 100 may perform the DMA operation associated with the first write data WRD1.

In operation S244, the host 11 may be in the overhead (O/H) state. That is, the host 11 may prepare a DMA operation associated with second write data WRD2 during a predetermined time.

After the host overhead, in operation S245, the host 11 may transmit the second write data WRD2 to the storage controller 100. That is, the host 11 and the storage controller 100 may perform the DMA operation associated with the second write data WRD2. In an embodiment, the storage controller 100 and the host 11 may perform the DMA operation associated with multiple write data by repeatedly performing operation S242 to operation S245.

In operation S246, the storage controller 100 may program the write data, on which the DMA operation is completed, in the nonvolatile memory devices 101 to 10$i$. In an embodiment, a program operation of the nonvolatile memory devices 101 to 10$i$ may be a device overhead or a device overhead state. The device overhead may indicate a delay due to an operation performed within the storage device 12. In an embodiment, in the case of a general write command, operation S246 may be omitted.

Afterwards, the host 11 and the storage controller 100 may perform operation S250 to operation S270. Operation S250 to operation S270 may be similar to operation S150 to operation S170 of FIG. 3, and thus, a detailed description thereof will not be repeated here.

In an embodiment, in the host overhead period, the clock managing unit 120 may not provide the corresponding clock to the corresponding function block. For example, in operation S232, the clock managing unit 120 may not provide the command fetch block 112 with the second clock CLK2. In operation S242 and operation S244, the clock managing unit 120 may not provide the main control block 113 and the DMA engine block 114 with the third clock CLK3 and the fourth clock CLK4. In other words, in addition to controlling a clock depending on an operation state of each function block of the NVMe control unit 110, the clock managing unit 120 may recognize the host overhead state and may not provide the corresponding clock to the corresponding function block in the host overhead state. Accordingly, since the whole time to provide a clock decreases, power consumption of the storage device 12 is reduced. To be clear, when the clock is not provided, this is due to an affirmative determination or recognition, such that the clock is otherwise provided absent the affirmative determination or recognition such as when the host overhead state is not recognized.

Figure 8:
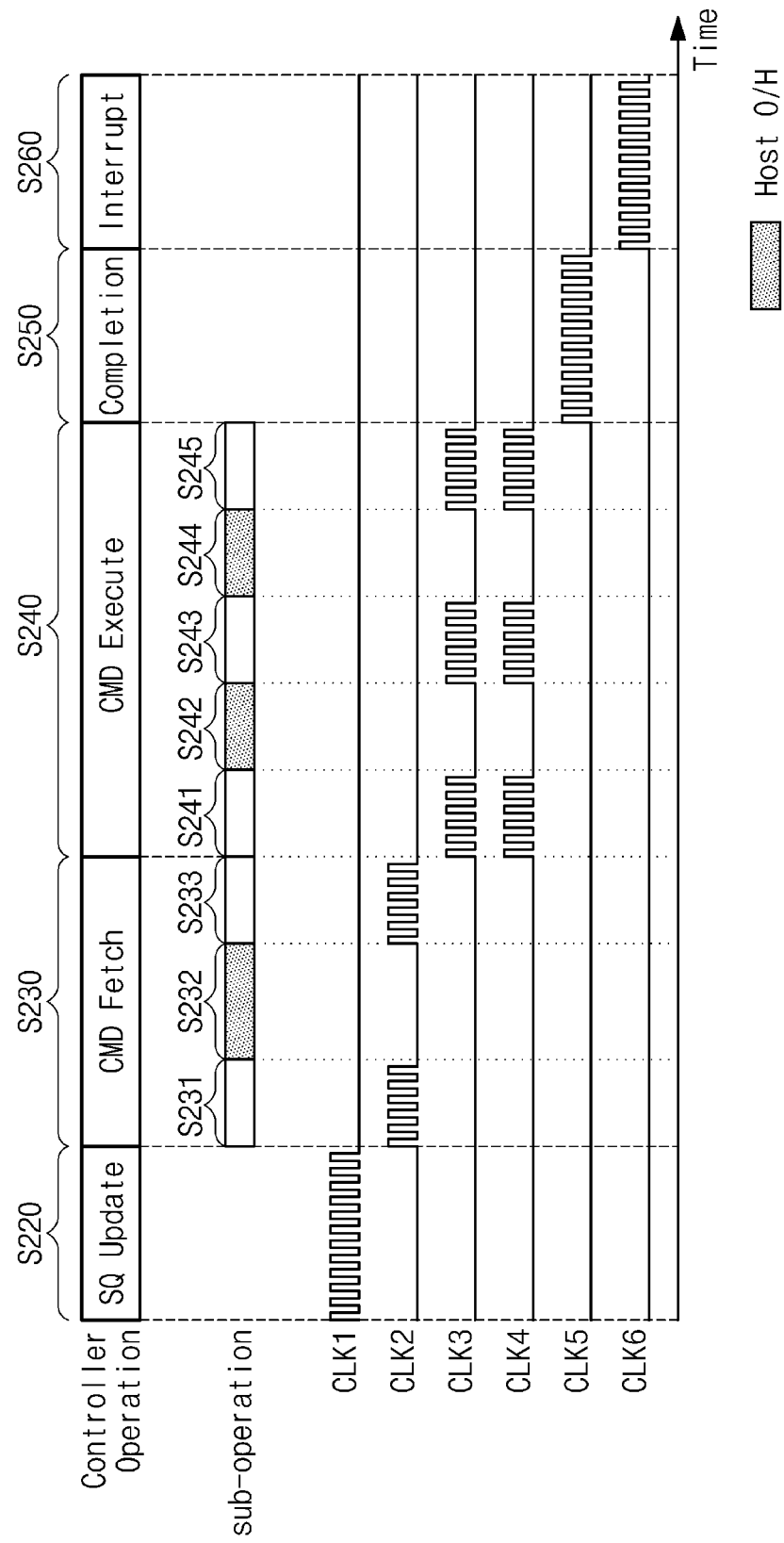
FIG. 8 is a timing diagram illustrating a first clock to a sixth clock according to an operation of FIG. 7.

FIG. 8 is a timing diagram illustrating the first clock CLK1 to the sixth clock CLK6 according to the operation of FIG. 7. For a brief description, components that are unnecessary to describe the first clock CLK1 to the sixth clock CLK6 according to the operation of FIG. 7 are omitted.

Referring to FIGS. 4, 7, and 8, the clock managing unit 120 may selectively activate the first clock CLK1 to the sixth clock CLK6, in the submission queue (SQ) update period, the command (CMD) fetch period, a write data (WRD) DMA period, the completion period, and the interrupt period. The submission queue update period, the command fetch period, the write data DMA period, the completion period, and the interrupt period may correspond to operation S220 to operation S260 of FIG. 7, respectively. The submission queue update period, the completion period, and the interrupt period are similar to those described with reference to FIG. 6, and thus, a detailed description thereof will not be repeated here.

Unlike the embodiment of FIG. 6, in the embodiment of FIG. 8, during the command fetch period, the clock managing unit 120 may detect a host overhead and may deactivate the second clock CLK2 in the host overhead period.

For example, the clock managing unit 120 may activate the second clock CLK2 in the period where the memory read request is transmitted (i.e., operation S231 of FIG. 7), and the command fetch block 112 may transmit the memory read request to the host 11 based on the activated second clock CLK2.

Afterwards, in the host overhead period (i.e., operation S232 of FIG. 7), the clock managing unit 120 may deactivate the second clock CLK2. Since the command fetch block 112 cannot perform a separate operation due to the host overhead, an abnormal operation may be prevented from occurring even though the second clock CLK2 is deactivated.

Afterwards, the clock managing unit 120 may activate the second clock CLK2 while the command CMD is fetched from the host 11 (i.e., operation S233 of FIG. 7), and the command fetch block 112 may fetch the command CMD based on the activated second clock CLK2.

As in the command fetch period, during the write data DMA period, the clock managing unit 120 may detect a host overhead and may deactivate the third and fourth clocks CLK3 and CLK4 in the host overhead period. For example, in the DMA request period (i.e., operation S241 of FIG. 7) and in the DMA operation execution period (i.e., operation S243 and operation S245 of FIG. 7), the clock managing unit 120 may activate the third and fourth clocks CLK3 and CLK4, and the main control block 113 and the DMA engine block 114 may transmit the DMA request based on the activated third and fourth clocks CLK3 and CLK4 and may perform the DMA operation associated with write data based on the activated third and fourth clocks CLK3 and CLK4. In the host overhead period (i.e., operation S242 and operation S244 of FIG. 7), the clock managing unit 120 may deactivate the third and fourth clocks CLK3 and CLK4.

As described above, the storage controller 100 according to the present disclosure may selectively activate clocks depending on operation states of function blocks. The storage controller 100 according to the present disclosure may recognize the host overhead and may deactivate a relevant clock in the host overhead period. Accordingly, since the whole time to provide a clock decreases, power consumption of the storage device 12 is reduced.

Figure 9:
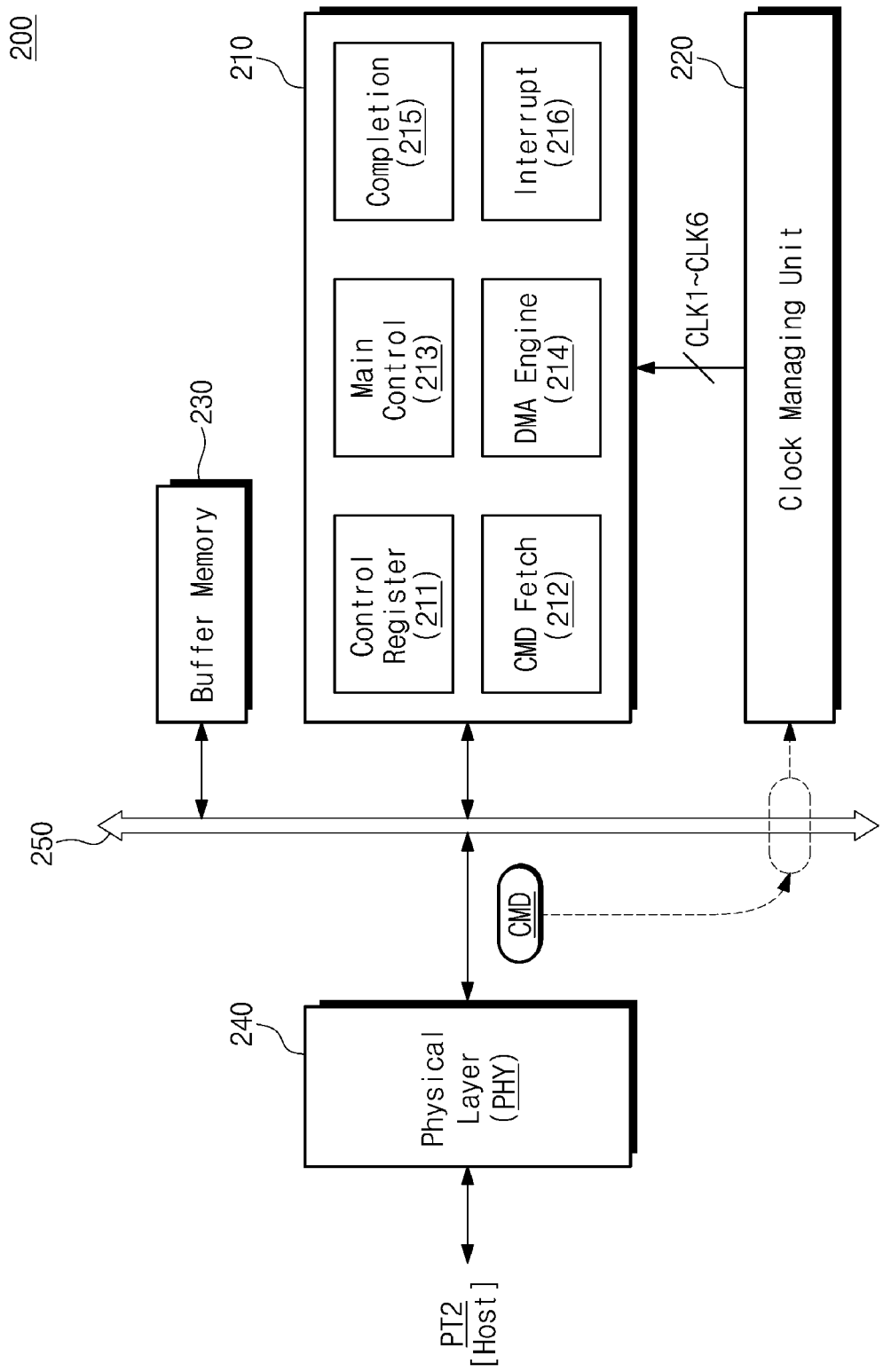
FIGS. 9 and 10 are views for describing an operation where a clock managing unit detects a host overhead.
Figure 10:
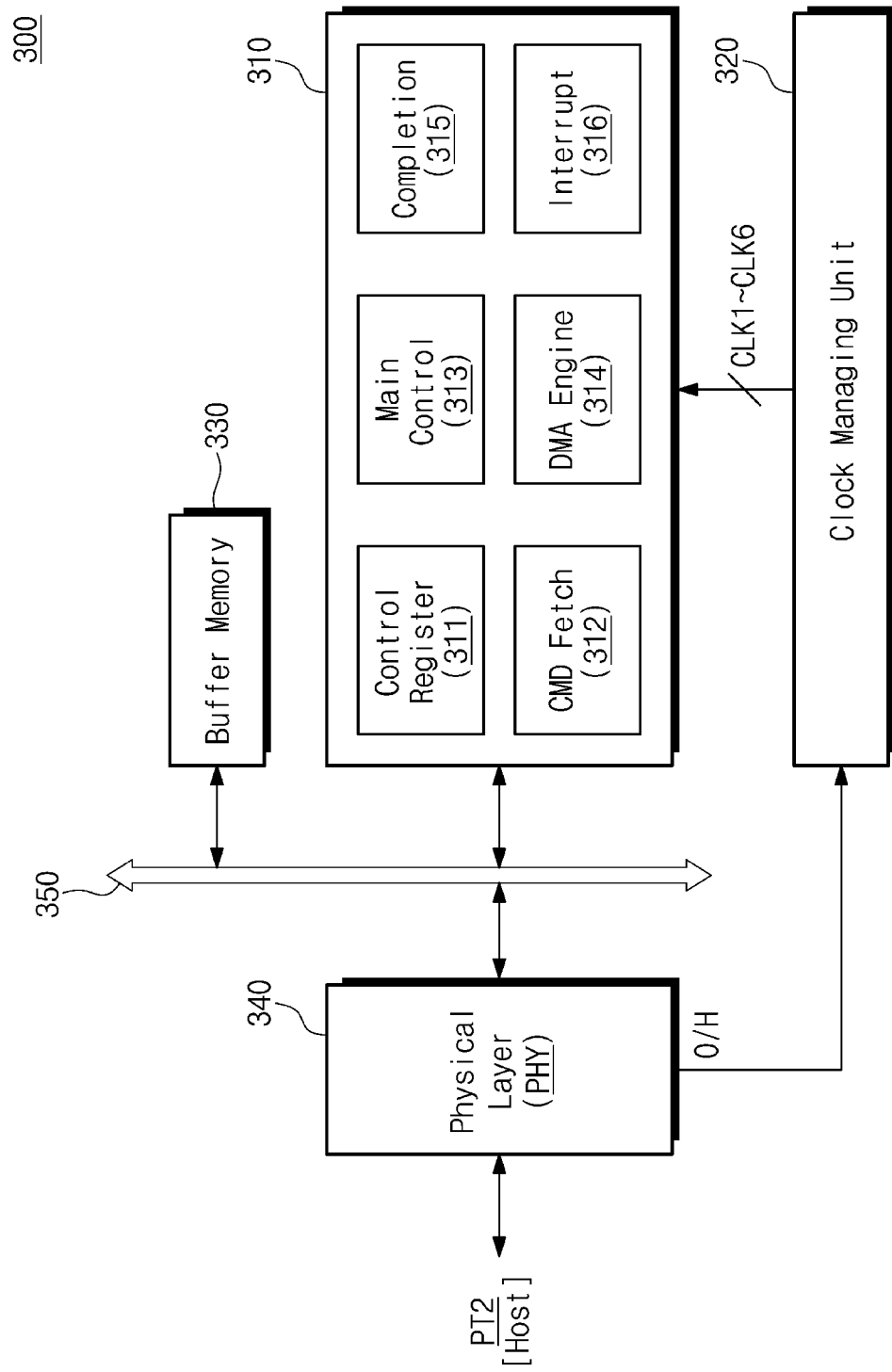

FIGS. 9 and 10 are views for describing an operation where a clock managing unit detects a host overhead. For brevity of illustration and convenience of description, components that are unnecessary to describe an operation where a clock managing unit detects a host overhead are omitted.

Referring to FIG. 9, a storage controller 200 may include an NVMe control unit 210, a clock managing unit 220, a buffer memory 230, a physical layer 240, and a system bus 250. The NVMe control unit 210 may include a control register block 211, a command fetch block 212, a main control block 213, a DMA engine 214, a completion block 215, and an interrupt block 216. The components of the storage controller 200 are described with reference to FIGS. 1 to 8, and thus, a detailed description thereof will not be repeated here.

The clock managing unit 220 may detect the host overhead, by detecting that the command CMD is provided through the system bus 250. For example, after a command read request is transmitted to the host 11 by the command fetch block 212, the clock managing unit 220 may deactivate the second clock CLK2.

Afterwards, the command CMD received from the host 11 may be set in the physical layer 240 and may be provided to the command fetch block 212 through the system bus 250 (i.e., while the command fetch block 212 fetches the command). In this case, the clock managing unit 220 may recognize, through the system bus 250, that the command CMD is set in the physical layer 240 and may activate the second clock CLK2 based on the recognized result. That is, the clock managing unit 220 may recognize a host overhead end point by recognizing that the command CMD is set in the physical layer 240, through the system bus 250. In other words, the clock managing unit 220 detects information which indicates that the command from an external device (i.e., the host 11) is provided through the system bus 250, selectively deactivates the second clock CLK2, then recognizes that the command CMD is set in the physical layer 240, and activates the second CLK2 based on the recognized result. Thus, the clock managing unit 220 also detects information about the host overhead (i.e., the host overhead end point) from the physical layer 240 by recognizing that the command CMD is set in the physical layer 240.

Referring to FIG. 10, a storage controller 300 may include an NVMe control unit 310, a clock managing unit 320, a buffer memory 330, a physical layer 340, and a system bus 350. The NVMe control unit 310 may include a control register block 311, a command fetch block 312, a main control block 313, a DMA engine 314, a completion block 315, and an interrupt block 316. The components of the storage controller 300 are described with reference to FIGS. 1 to 8, and thus, a detailed description thereof will not be repeated here.

The clock managing unit 320 may recognize the host overhead, based on a separate overhead signal O/H provided from the physical layer 340. For example, in the command fetch period, when the command CMD is set, the physical layer 340 may provide the overhead signal O/H to the clock managing unit 320 through a separate signal line or a separate channel. The clock managing unit 320 may recognize the host overhead based on the received overhead signal O/H and may control each clock based on the above-described method.

In an embodiment, the overhead signal O/H may be provided from the physical layer 340 or may be provided from the host 11. For example, the host 11 may provide the clock managing unit 320 with information about the host overhead through a side band channel.

Figure 11:
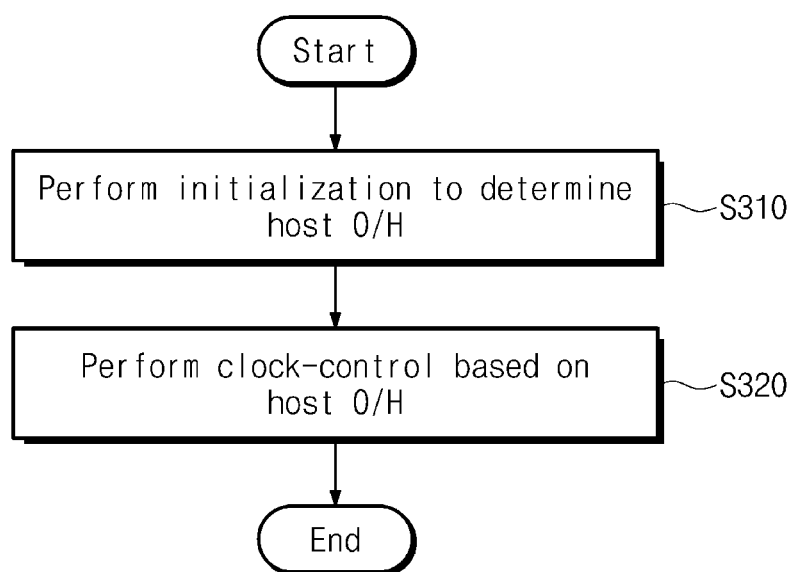
FIG. 11 is a flowchart illustrating a method in which a clock managing unit sets information about a host overhead.

FIG. 11 is a flowchart illustrating a method in which a clock managing unit sets information about a host overhead. Referring to FIGS. 1 and 11, in operation S310, the storage controller 100 may perform initialization to set information about a host overhead. The host overhead may be determined depending on a characteristic of the host 11. For example, in the command fetch period, the host 11 may prepare for transmitting the command CMD during a predefined time. The storage controller 100 may determine the predefined time in the initialization operation. In an embodiment, the predefined time may be determined by repeatedly performing a specific operation or may be determined through a separate operation.

In operation S320, the storage controller 100 may perform clock-control based on the determined host overhead. For example, as described above, the storage controller 100 may control clocks to be provided to function blocks of the NVMe control unit 110 based on the determined host overhead (i.e., a host overhead time). The clock-control based on the host overhead is described above, and thus, a detailed description thereof will not be repeated here.

Figure 12:
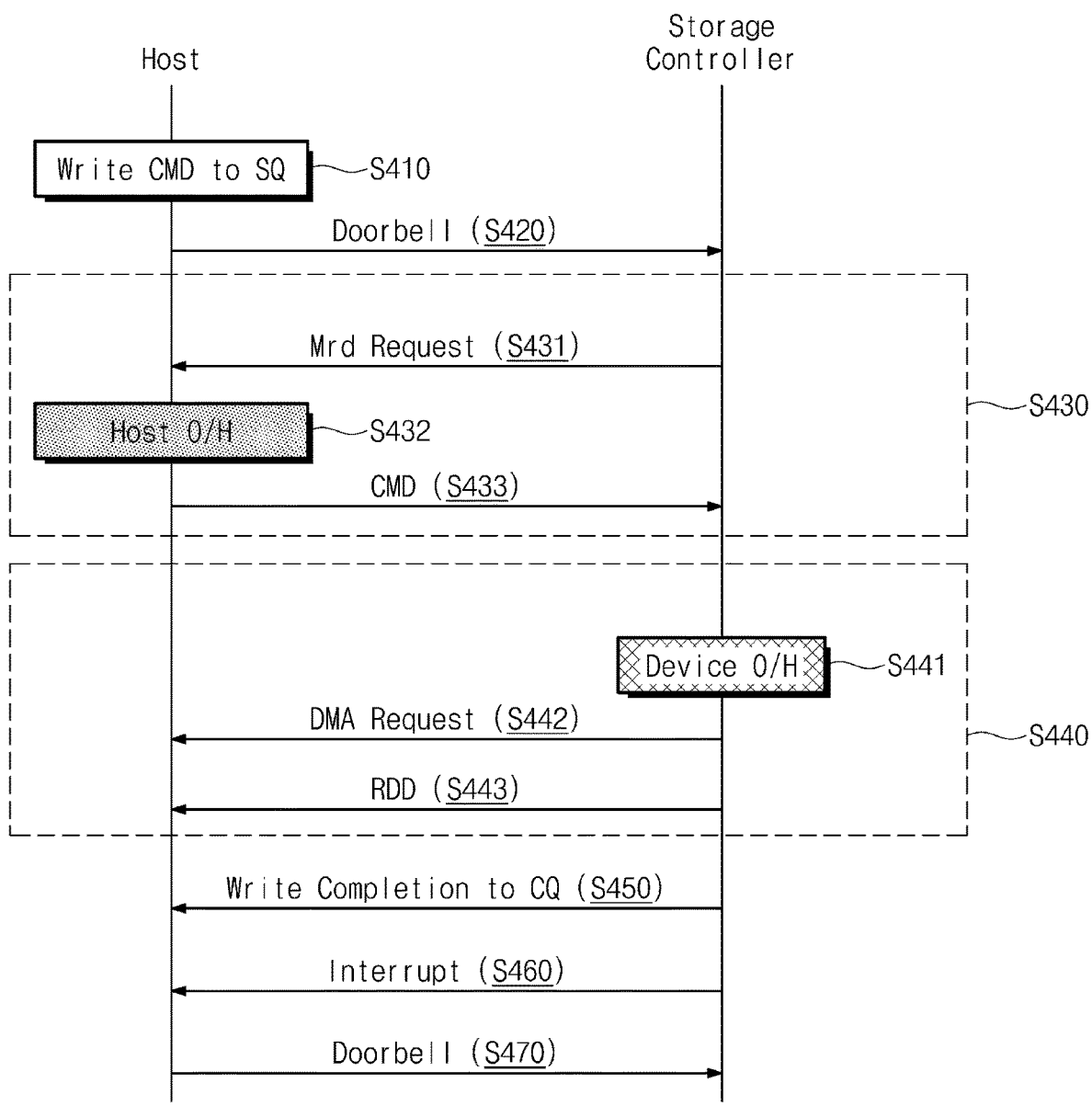
FIG. 12 is a flowchart illustrating an operation of a storage system of FIG. 1.

FIG. 12 is a flowchart illustrating an operation of the storage system 10 of FIG. 1. In an embodiment, a read operation of the storage system 10 will be described with reference to FIG. 12. For a brief description, a description that is the same as the above-described contents is omitted.

Referring to FIGS. 1 and 12, the host 11 may perform operation S410 and operation S420. Operation S410 and operation S420 are similar to operation S110 and operation S120 of FIG. 3, and thus, a detailed description thereof will not be repeated here.

The storage controller 100 may fetch the command CMD through operation S430 including operation S431 to operation S433. Operation S431 to operation S433 belonging to the operation S430 are similar to operation S231 to operation S233 belonging to operation S230 of FIG. 7, and thus, a detailed description thereof will not be repeated here.

In operation S440, the storage controller 100 may perform an operation corresponding to the fetched command CMD. For example, when the fetched command CMD is a read command, the storage controller 100 may perform operation S441 to operation S443.

In operation S441, the storage controller 100 may be in a device overhead (O/H) state. For example, the storage controller 100 may prepare relevant read data in response to the fetched command CMD (i.e., the read command). A time to prepare the read data may act as the device overhead. In an embodiment, the preparing of data may indicate an operation of reading read data from the nonvolatile memory devices 101 to 10i and storing the read data in the buffer memory 130 or an operation of preparing data such that read data are transmitted to the host 11.

During the device overhead, the clock managing unit 120 may deactivate the corresponding clock provided to the corresponding function block. For example, the clock managing unit 120 may deactivate the third clock CLK3 and the fourth clock CLK4 provided to the main control block 113 and the DMA engine block 114 during the device overhead.

After the device overhead, in operation S442, the storage controller 100 may transmit a DMA request to the host 11. The DMA request may be a request for a DMA operation of transmitting the read data to the host 11. In step S443, the storage controller 100 may transmit read data RDD to the host 11 through the DMA operation. In other words, when the fetched command CMD is a read command, an operation corresponding to the fetched command CMD may include transmitting a direct memory access (DMA) request to an external device (i.e., the host 11), and then transmitting the read data to the external device through the DMA operation.

Afterwards, the storage controller 100 and the host 11 may perform operation S450 to operation S470. Operation S450 to operation S470 are similar to operation S150 to operation S170 of FIG. 3, and thus, a detailed description thereof will not be repeated here.

As described above, in the read operation of the storage system 10, the storage controller 100 may detect the device overhead as well as the host overhead and may deactivate a clock in the detected device overhead period. Accordingly, power consumption of the storage system 10 is reduced.

Figure 13:
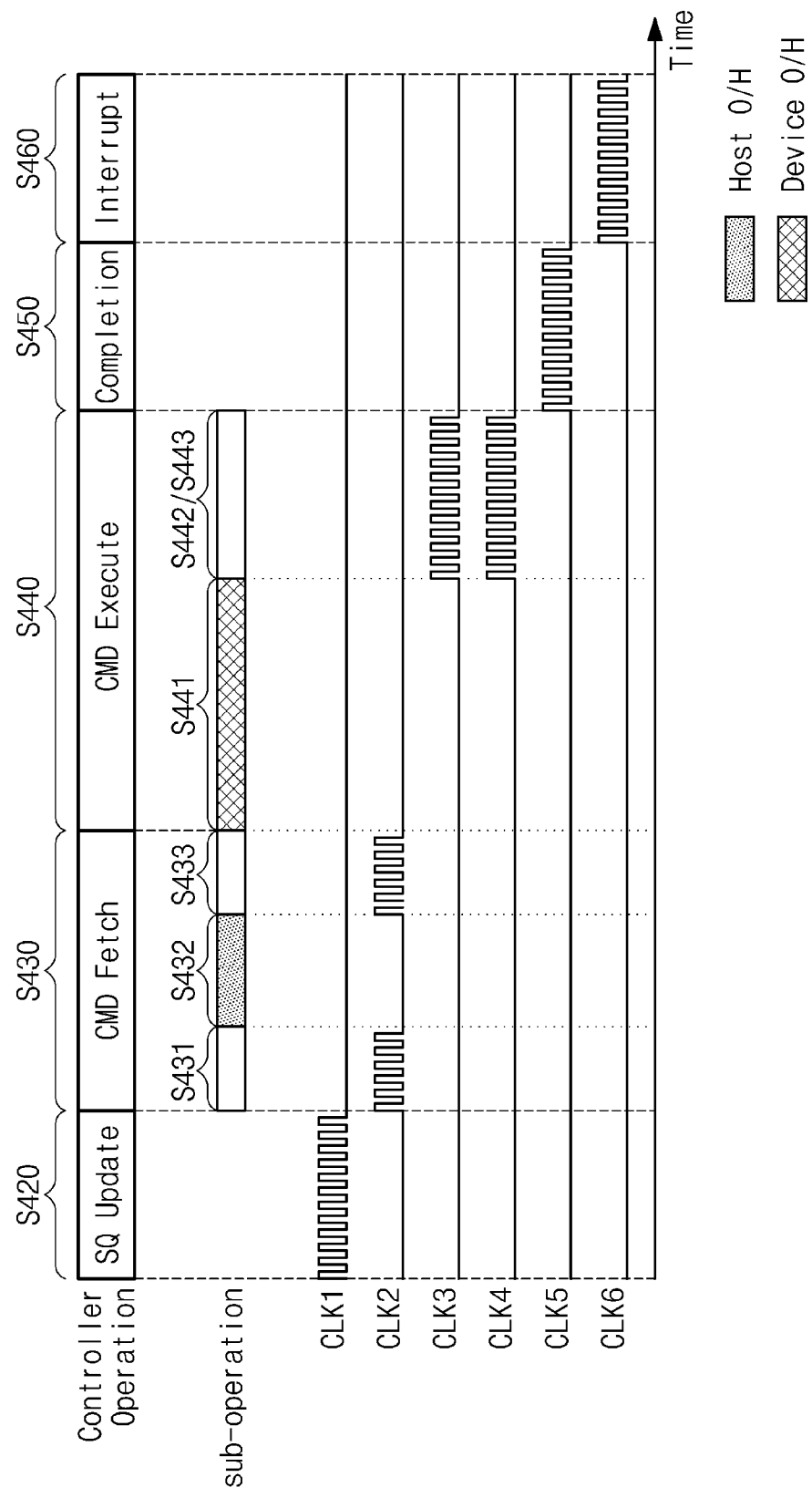
FIG. 13 is a timing diagram illustrating a first clock to a sixth clock according to an operation method of FIG. 12.

FIG. 13 is a timing diagram illustrating the first clock CLK1 to the sixth clock CLK6 according to the operation method of FIG. 12. For a brief description, the above description and components that are unnecessary to describe the first clock CLK1 to sixth clock CLK6 according to the operation method of FIG. 12 are omitted.

Referring to FIGS. 1, 12, and 13, the clock managing unit 120 may selectively activate the first clock CLK1 to the sixth clock CLK6, in the submission queue (SQ) update period, the command (CMD) fetch period, a read data (RDD) DMA period, the completion period, and the interrupt period. The submission queue update period, the command fetch period, the read data DMA period, the completion period, and the interrupt period may correspond to operation S420 to operation S460 of FIG. 12, respectively. Sub-operations of the command fetch period may correspond to operation S431 to operation S433 of FIG. 12, respectively.

The submission queue update period, the command fetch period, the completion period, and the interrupt period are similar to those described with reference to FIGS. 6 and 8, and thus, a detailed description thereof will not be repeated here.

In the embodiment of FIG. 12, during the read data DMA period (RDD DMA), the clock managing unit 120 may detect a device overhead and may deactivate the third and fourth clocks CLK3 and CLK4 in the device overhead period. For example, in the device overhead period (i.e., operation S441 of FIG. 12), the clock managing unit 120 may deactivate the third and fourth clocks CLK3 and CLK4. During the device overhead, since read data are read from the nonvolatile memory devices 101 to 10i and the read data are stored in the buffer memory 130, an abnormal operation may be prevented from occurring even though the third and fourth clocks CLK3 and CLK4 are deactivated. That is, an abnormal operation may still be prevented even though the third and fourth clocks CLK3 and CLK4 are deactivated, since the read data are stored in the buffer memory 130 during the device overhead. In a period (i.e., operation S442 and operation S443 of FIG. 12) following the device overhead period, the clock managing unit 120 may activate the third and fourth clocks CLK3 and CLK4.

As described above, the storage controller 100 according to the present disclosure may selectively activate or deactivate the corresponding clock depending on an operation state of each function block. The storage controller 100 may recognize the host overhead or the device overhead, and may control a clock based on the recognized overhead. Accordingly, since the whole time to provide a clock decreases, power consumption of the storage device 12 is reduced.

Figure 14:
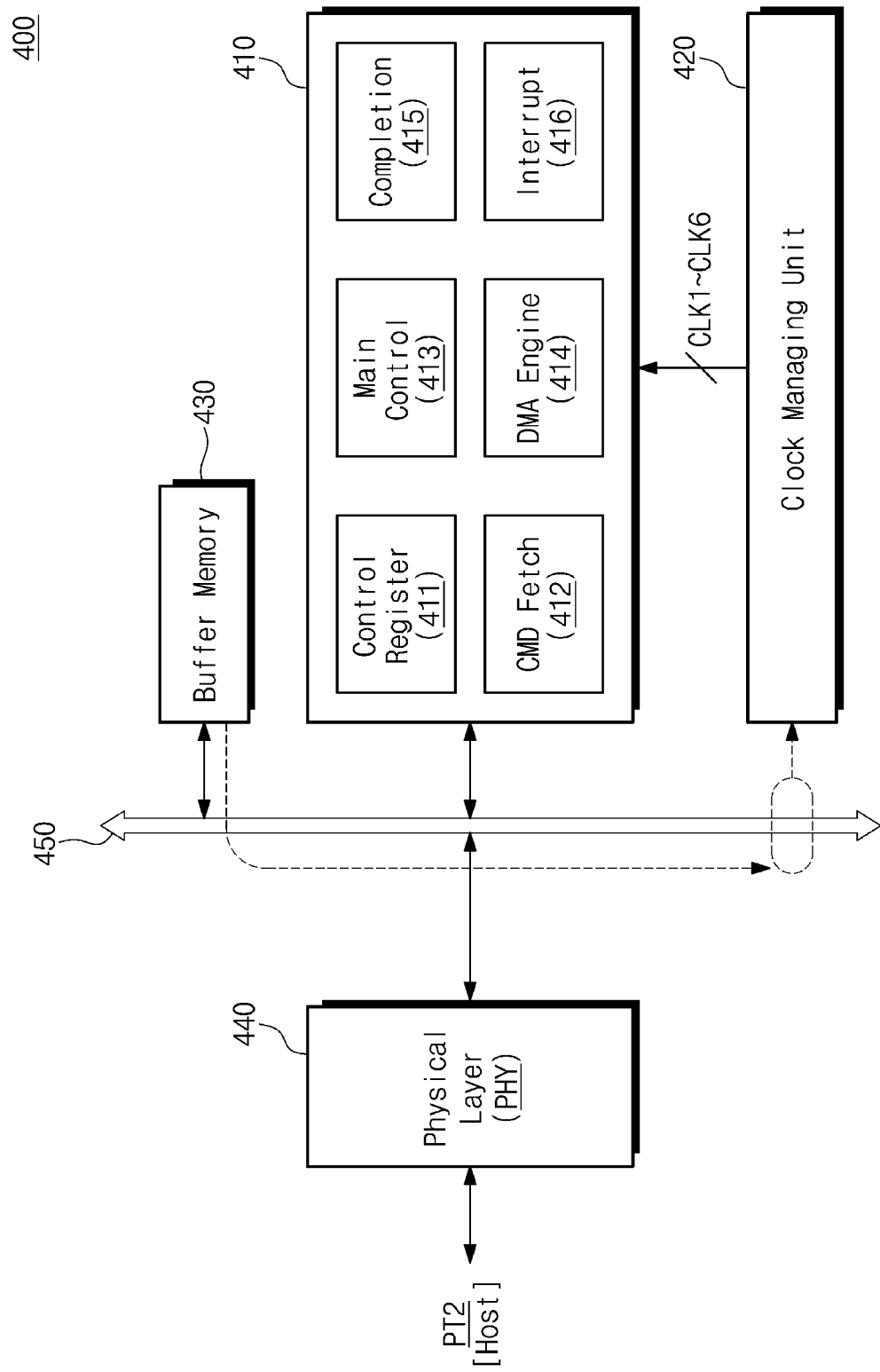
FIG. 14 is a view for describing an operation where a clock managing unit detects a device overhead.

FIG. 14 is a view for describing an operation where a clock managing unit detects a device overhead. Referring to FIG. 14, a storage controller 400 may include an NVMe control unit 410, a clock managing unit 420, a buffer memory 430, a physical layer 440, and a system bus 450. The NVMe control unit 410 may include a control register block 411, a command fetch block 412, a main control block 413, a DMA engine 414, a completion block 415, and an interrupt block 416. The components of the storage controller 400 are described with reference to FIGS. 1 to 8, and thus, a detailed description thereof will not be repeated here.

The clock managing unit 420 may receive information indicating that read data are stored, from the buffer memory 430 through the system bus 450 and may control the third and fourth clocks CLK3 and CLK4 based on the received information. For example, in the case of receiving, through the system bus 450, information indicating that read data are stored, the clock managing unit 420 may activate the third and fourth clocks CLK3 and CLK4.

Although not illustrated in FIG. 14, the NVMe control unit 410 may include a flash memory controller (FMC) for controlling the nonvolatile memory devices 101 to 10i, and may receive, from the flash memory controller, information indicating that read data are prepared.

In an embodiment, although not illustrated in FIG. 14, the clock managing unit 420 may be configured to control a clock provided to the flash memory controller (FMC) through the above-described methods according to the embodiments of the present disclosure. That is, the clock managing unit 420 may be configured to provide a clock to the flash memory controller only in a period where the flash memory controller operates.

Figure 15:
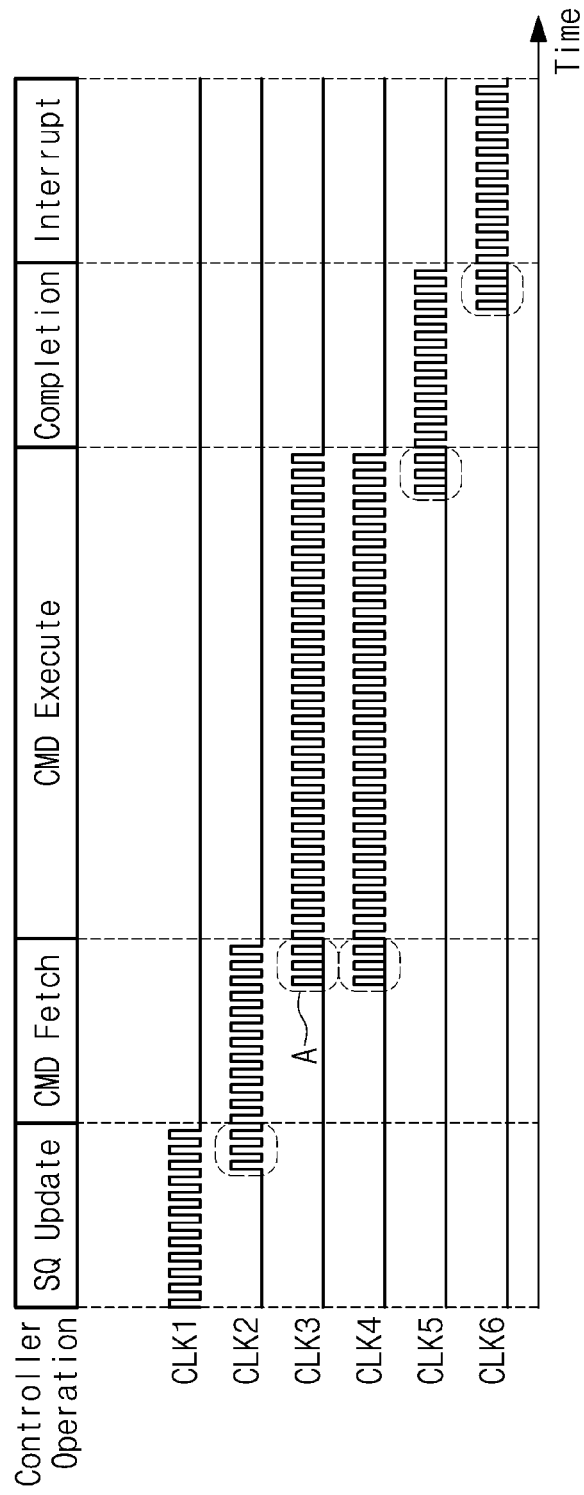
FIG. 15 is a view illustrating a first clock to a sixth clock according to an embodiment of the present disclosure.

FIG. 15 is a view illustrating a first clock to a sixth clock according to an embodiment of the present disclosure. For a brief description, only components that are different from those described with reference to the above embodiments will be described with reference to FIG. 15.

Referring to FIGS. 1 and 15, the clock managing unit 120 may selectively activate the first clock CLK1 to the sixth clock CLK6, in the submission queue (SQ) update period, the command (CMD) fetch period, the read data (RDD) DMA period, the completion period, and the interrupt period. A way to control a clock in each period is described with reference to FIGS. 1 to 14, and thus, a detailed description thereof will not be repeated here.

In the embodiment of FIG. 15, the clock managing unit 120 may activate a clock to be provided in a next period in advance as much as a predetermined time, in a current period. For example, in the above embodiments, during the command fetch period, the clock managing unit 120 may activate only the second clock CLK2 and may deactivate the remaining clocks CLK1 and CLK3 to CLK6. In contrast, as illustrated in a period "A" of FIG. 15, the clock managing unit 120 may activate the third and fourth clocks CLK3 and CLK4 in the command fetch period. That is, the third and fourth clocks CLK3 and CLK4 may be activated in advance as much as a predetermined time, compared with the command execution period corresponding to the third and fourth clocks CLK3 and CLK4. Since each clock is activated in advance as much as a predetermined time, a clock that is provided to each function block may be stabilized, and thus, the reliability of operation of each function block may be improved.

The embodiments of the present disclosure described above may be exemplified to describe the technical idea(s) of the present disclosure clearly and in detail, and the inventive concept(s) of the present disclosure are not limited thereto.

Figure 16A:
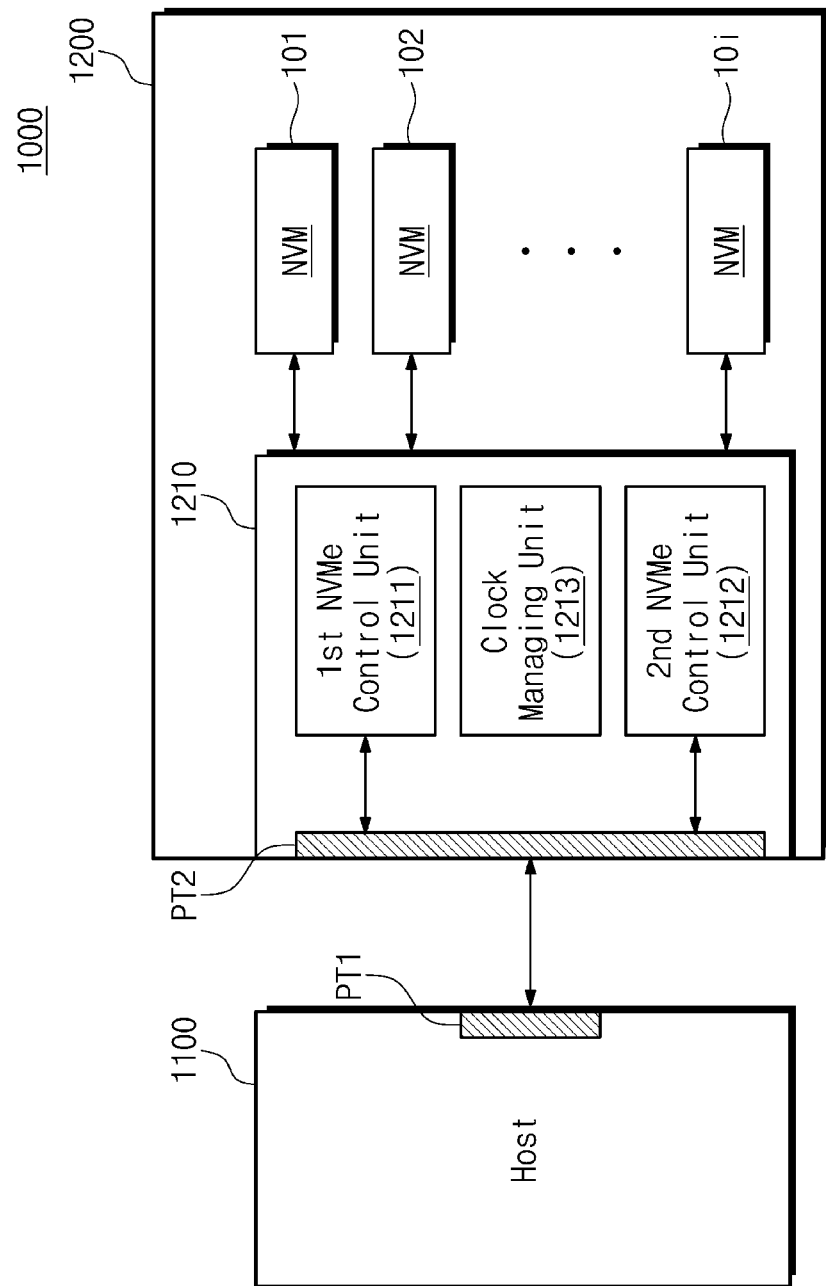
FIGS. 16A to 16C are block diagrams illustrating various topologies of a storage system according to the present disclosure.
Figure 16B:
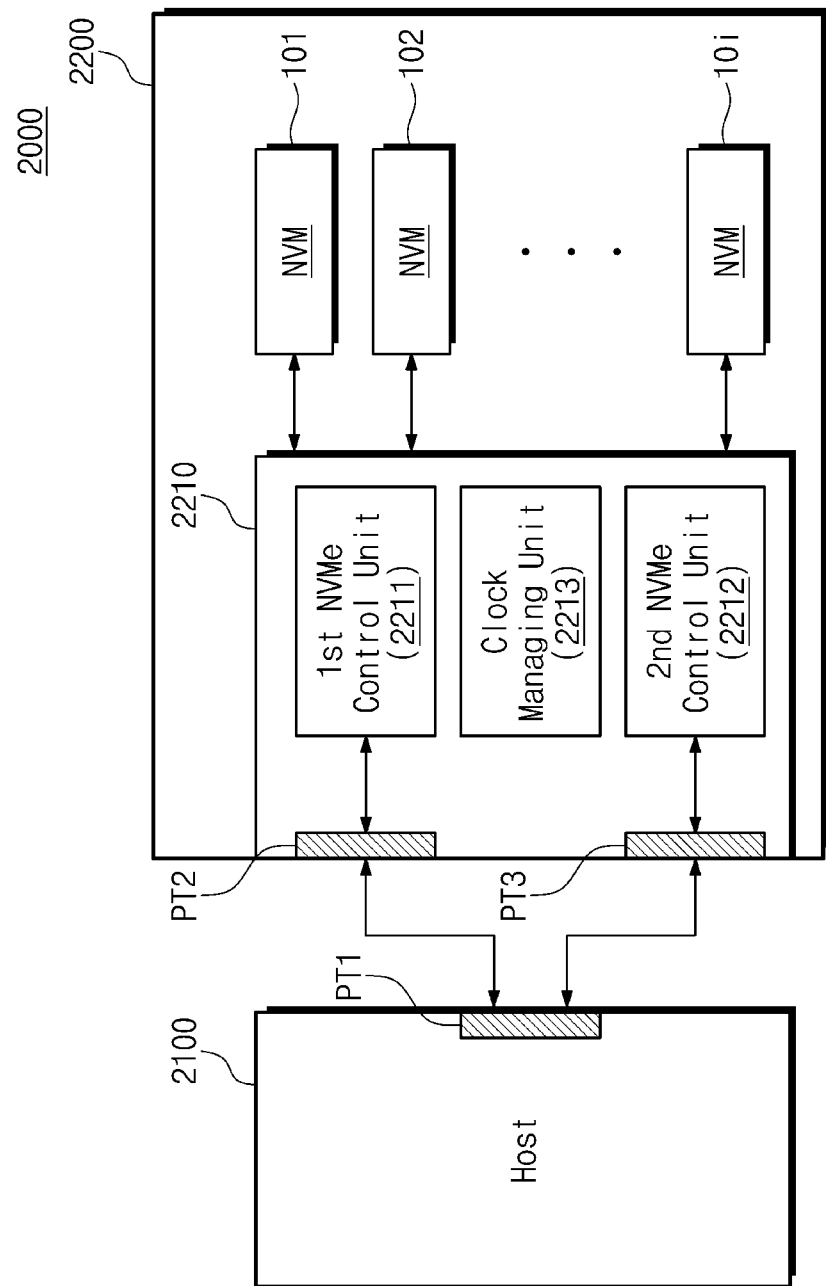
Figure 16C:
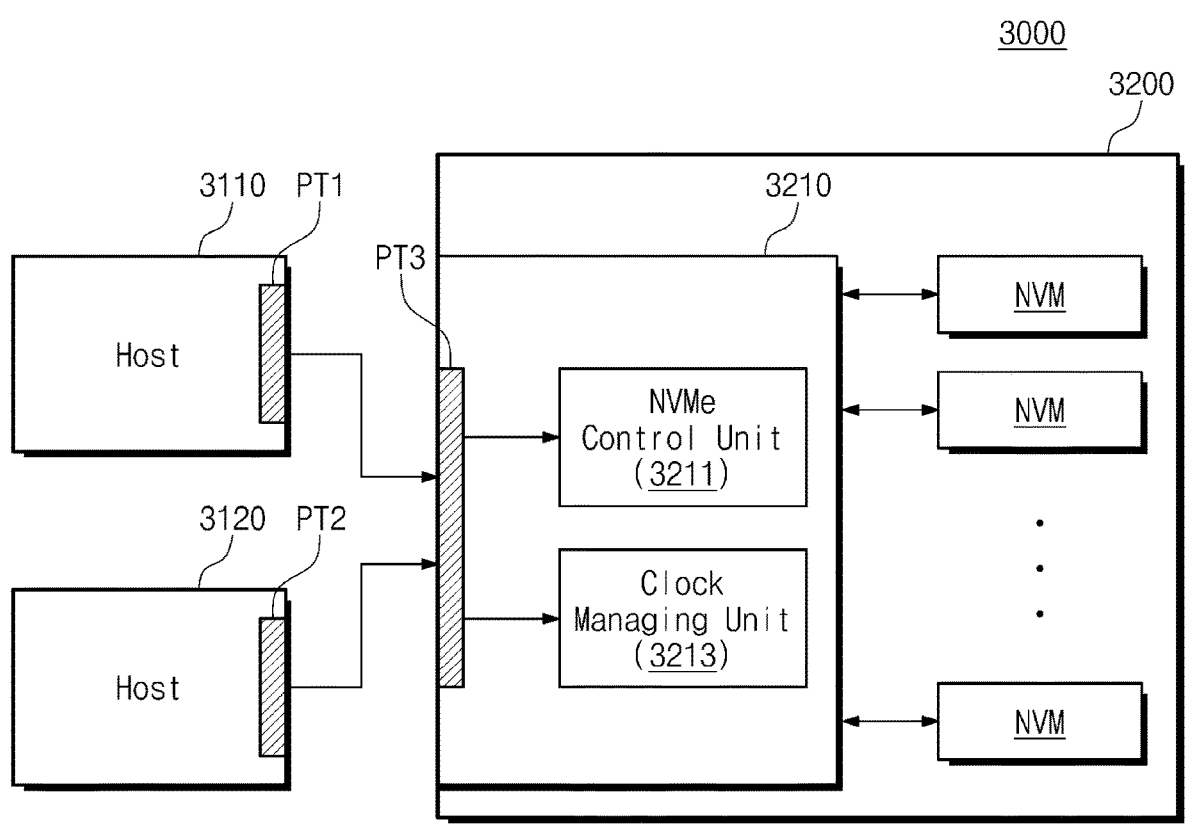

FIGS. 16A to 16C are block diagrams illustrating various topologies of a storage system according to the present disclosure. Referring to FIG. 16A, a storage system 1000 may include a host 1100 and a storage device 1200. The storage device 1200 may include a storage controller 1210 and the nonvolatile memory devices 101 to 10i. The storage controller 1210 may include first NVMe control unit 1211 and second NVMe control unit 1212 and a clock managing unit 1213. Each of the first NVMe control unit 1211 and second NVMe control unit 1212 may be an NVMe control unit described with reference to FIGS. 1 to 15, and the clock managing unit 1213 may be a clock managing unit described with reference to FIGS. 1 to 15.

The host 1100 may include a first port PT1, and the storage controller 1210 may include a second port PT2. The host 1100 and the storage controller 1210 may communicate with each other through the first port PT1 and second port PT2. The first port PT1 and second port PT2 may be a physical port that is based on the PCIe protocol, but the ports of the present disclosure are not limited thereto.

In an embodiment, the first NVMe control unit 1211 and second NVMe control unit 1212 may be physically separated to perform a physical function. Alternatively, the first NVMe control unit 1211 and second NVMe control unit 1212 may be logically divided to perform a virtualization function. In an embodiment, the first NVMe control unit 1211 and second NVMe control unit 1212 may be implemented through single-root input/output virtualization (SR-IOV).

Referring to FIG. 16B, a storage system 2000 may include a host 2100 and a storage device 2200. The storage device 2200 may include a storage controller 2210 and the nonvolatile memory devices 101 to 10i. The storage controller 2210 may include first NVMe control unit 2211 and second NVMe control unit 2212 and a clock managing unit 2213. The clock managing unit 2213 may be a clock managing unit described with reference to FIGS. 1 to 15.

The host 2100 may include a first port PT1, and the storage controller 2210 may include a second port PT2 and a third port PT3. The host 2100 and the storage controller 2210 may communicate with each other through the first port PT1 to third port PT3. In this case, the first NVMe control unit 2211 may operate based on a signal provided through the second port PT2, and the second NVMe control unit 2212 may operate based on a signal provided through the third port PT3. That is, the first NVMe control unit 2211 and second NVMe control unit 2212 may be implemented as control devices physically separated from each other.

Referring to FIG. 16C, a storage system 3000 may include hosts 3110 and 3120 and a storage device 3200. The storage device 3200 may include a storage controller 3210 and the nonvolatile memory devices 101 to 10i. The storage controller 3210 may include an NVMe control unit 3211 and a clock managing unit 3213. The NVMe control unit 3211 and the clock managing unit 3213 may be an NVMe control unit and a clock managing unit described with reference to FIGS. 1 to 15.

The host 3110 may include a first port PT1, the host 3120 may include a second port PT2, and the storage controller 3210 may include a third port PT3. The hosts 3110 and 3120 and the storage controller 3210 may communicate with each other through the first port PT1 to third port PT3.

In an embodiment, the storage systems 1000 to 3000 are exemplary, and the storage systems 1000 to 3000 are not limited thereto. A host and a storage device may communicate with each other through any other communications manners (e.g., network fabric and the like) in addition to a physical port or channel.

Figure 17:
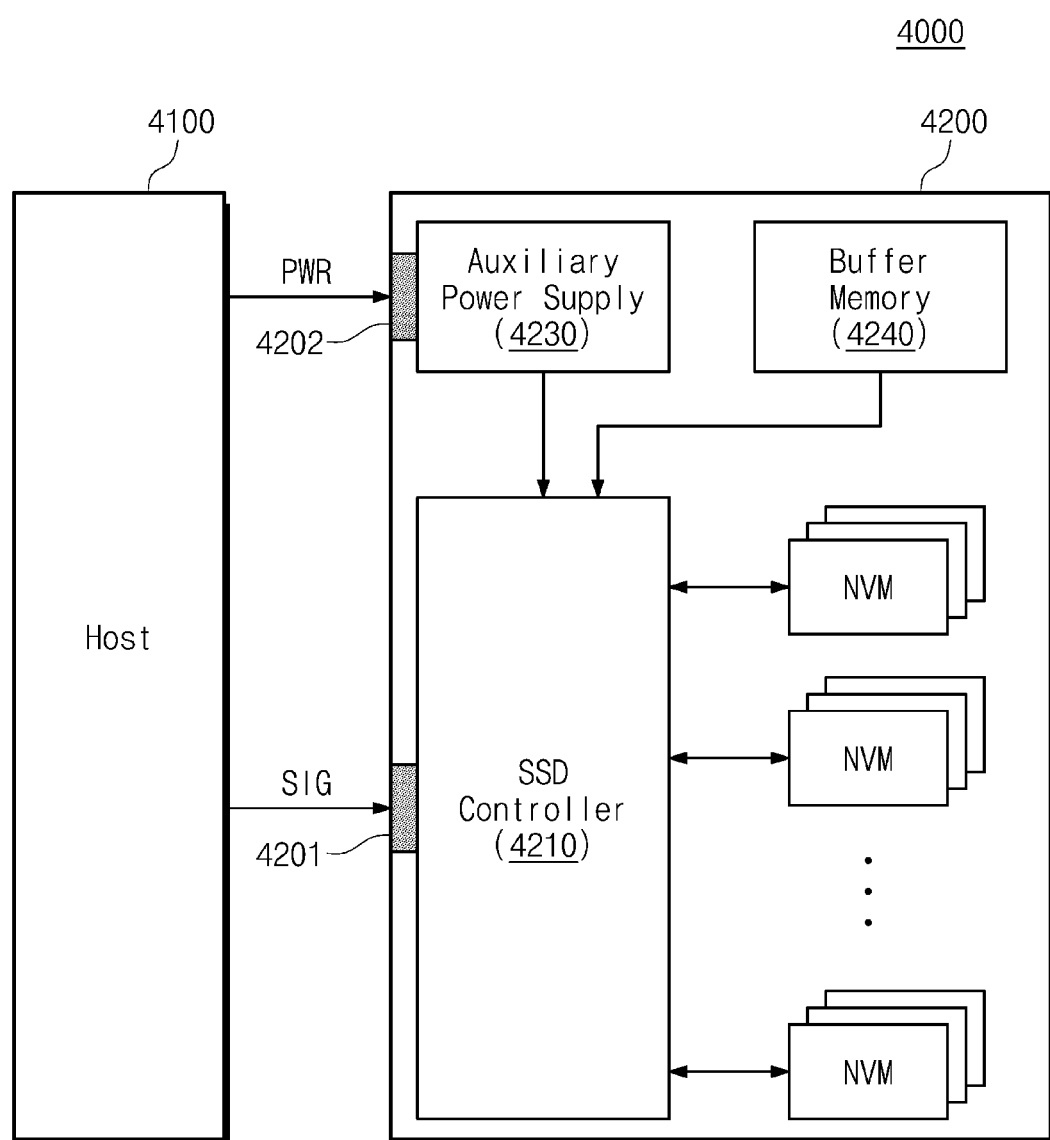
FIG. 17 is a block diagram illustrating a solid state drive system to which the present disclosure is applied.

FIG. 17 is a block diagram illustrating a solid-state drive (SSD) system to which the present disclosure is applied. Referring to FIG. 17, an SSD system 4000 may include a host 4100 and an SSD 4200.

The SSD 4200 transmits and receives a signal SIG to and from the host 4100 through a signal connector 4201 and is supplied with power PWR through a power connector 4202. In an embodiment, the signal connector 4201 may be a physical port that is based on the PCIe protocol, but the signal connector 4201 is not limited thereto. The SSD 4200 includes an SSD controller 4210, multiple flash memories NVM, an auxiliary power supply 4230, and a buffer memory 4240.

The SSD controller 4210 may control the flash memories NVM in response to the signal SIG received from the host 4100. The flash memories NVM may operate under control of the SSD controller 4210. In an embodiment, the SSD controller 4210 may include an NVMe control unit and a clock managing unit described with reference to FIGS. 1 to 15.

The auxiliary power supply 4230 is connected with the host 4100 via the power connector 4202. The auxiliary power supply 4230 may be charged by the power PWR from the host 4100. When the power PWR is not smoothly supplied from the host 4100, the auxiliary power supply 4230 may provide the power of the SSD 4200.

The buffer memory 4240 operates as a buffer memory of the SSD 4200. For example, the buffer memory 4240 may temporarily store data received from the host 4100 or from the flash memories NVM or may temporarily store metadata (e.g., a mapping table) of the flash memories NVM. Alternatively, the buffer memory 4240 may temporarily store a variety of information needed for the SSD controller 4210 to operate.

According to embodiments of the present disclosure described above, a storage controller may selectively activate or deactivate a clock to be provided to each function block depending on an operation state of each function block. Alternatively, the storage controller may detect a host overhead or a device overhead and may control a clock to be provided to each function block based on the detected overhead. Accordingly, since the whole time to provide a clock decreases, power consumption of the storage device is reduced.

According to the present disclosure, a storage controller may reduce the whole time to provide a clock by selectively controlling a clock to be provided to each function block depending on an operation state of each function block.

Alternatively, according to the present disclosure, the storage controller may detect a host overhead or a device overhead and may control a clock to be provided to each function block based on the detected overhead. Accordingly, the storage controller with reduced power consumption, a storage device including the storage controller, and an operation method of the storage controller are provided.

While the inventive concept(s) described in the present disclosure have been described with reference to exemplary embodiments thereof, it will be apparent to those of ordinary skill in the art that various changes and modifications may be made thereto without departing from the spirit and scope of the inventive concept(s) described in the present disclosure as set forth in the following claims. As a simple example, generally the present disclosure describes that a completion block may write completion information based on a fifth clock. However, the numbering of clocks in embodiments described herein may vary, and more or fewer clocks may be provided than are described in embodiments herein. Accordingly, a completion block may write completion information based on a fourth clock, or based on a fifth clock, or based on a different clock, depending on how the clocks are numbered and how many different clocks are used.

What is claimed is:

1. An operation method of a storage controller which is configured to communicate with an external device including a submission queue and a completion queue, the method comprising:
   receiving a notification associated with a command from the external device, based on a first clock;
   fetching the command from the submission queue, based on a second clock;
   performing an operation corresponding to the fetched command, based on a third clock;
   writing completion information to the completion queue, based on a fourth clock; and
   transmitting an interrupt signal to the external device, based on a fifth clock,
   wherein each of the first clock to the fifth clock is selectively activated and independently enabled depending on the corresponding operation among the receiving, the fetching, the performing, the writing and the transmitting, and
   wherein the storage controller communicates with the external device, based on a nonvolatile memory express (NVMe) interface.

2. The method of claim 1, wherein the fetching of the command from the submission queue includes:
   transmitting a memory read request to the external device; and
   receiving the command from the external device.

3. The method of claim 2, wherein the second clock is deactivated from a time to transmit the memory read request to a time to receive the command.

4. The method of claim 1, wherein, when the fetched command is a write command, the performing of the operation corresponding to the fetched command includes:
   transmitting a direct memory access (DMA) request to the external device;
   receiving first write data through a first DMA operation from the external device; and
   receiving second write data through a second DMA operation from the external device.

5. The method of claim 4, wherein the third clock is deactivated from a time to transmit the direct memory access request to a time to start to receive the first write data, and
   wherein the third clock is deactivated from a time to completely receive the first write data to a time to start to receive the second write data.

6. The method of claim 1, wherein, when the fetched command is a read command, the performing of the operation corresponding to the fetched command includes:
   reading read data corresponding to the fetched command from a nonvolatile memory device in response to the fetched command;
   transmitting a direct memory access (DMA) request to the external device; and
   transmitting the read data to the external device through a DMA operation.

7. The method of claim 6, wherein the third clock is deactivated while the read data are read from the nonvolatile memory device.

8. The method of claim 1, wherein the notification is received through doorbell signaling from the external device.

9. A storage controller, comprising:
   a physical layer configured to communicate with an external device;
   an NVMe control unit connected with the physical layer through a system bus; and
   a clock managing unit,
   wherein the NVMe control unit includes:
   a control register block configured to receive information from the external device, based on a first clock;
   a command fetch block configured to fetch a command from the external device, based on a second clock;
   a direct memory access (DMA) engine configured to perform a DMA operation with the external device, based on a third clock;
   a completion block configured to write completion information to the external device, based on the fourth clock; and
   an interrupt block configured to transmit an interrupt signal to the external device, based on a fifth clock, and
   wherein the storage controller communicates with the external device, based on a nonvolatile memory express (NVMe) interface; and
   wherein the clock managing unit is configured to selectively activate and independently enable or selectively deactivate and independently disable each of the first clock, the second clock, the third clock, the fourth clock, and the fifth clock, depending on operations of the control register block, the command fetch block, the DMA engine, the completion block, and the interrupt block.

10. The storage controller of claim 9, wherein each of the first clock to the fifth clock is selectively activated depending on an operation state of each of the control register block, the command fetch block, the DMA engine, the completion block, and the interrupt block.

11. The storage controller of claim 9, wherein the clock managing unit detects information, which indicates that the command from the external device is set in the physical layer, through the system bus and selectively activates the second clock based on the detected information.

12. The storage controller of claim 9, wherein the clock managing unit detects information about a host overhead from the physical layer and selectively deactivates the second clock based on the information about the host overhead while the command fetch block fetches the command from the external device.

13. The storage controller of claim 12, wherein the clock managing unit selectively deactivates the second clock based on the information about the host overhead while the command fetch block fetches the command from the external device, and
wherein the host overhead is a predefined time when the command fetch block fetches the command from the external device.

14. The storage controller of claim 9, wherein, when the fetched command is a write command, the DMA engine transmits a write DMA request to the external device and performs a write DMA operation for write data with the external device, and
wherein the clock managing unit activates the third clock while the write DMA request is transmitted, deactivates the third clock from a time to transmit the write DMA request to a time to start the write DMA operation, and activates the third clock while the write DMA operation is performed.

15. The storage controller of claim 9, wherein, when the fetched command is a read command, the DMA engine transmits a read DMA request to the external device and performs a read DMA operation for read data with the external device, and
wherein the clock managing unit deactivates the third clock from a time to fetch the command to a time to transmit the read DMA request, and activates the third clock while the read DMA request is transmitted and while the read DMA operation is performed.

16. A storage device, comprising:
a plurality of nonvolatile memory devices; and
a storage controller configured to control the plurality of nonvolatile memory devices,
wherein the storage controller includes:
an NVMe control unit configured to perform operations including fetching a command from an external device, executing an operation corresponding to the fetched command, writing completion information about the operation to the external device, and transmitting an interrupt signal to the external device, based on a plurality of clocks; and
a clock managing unit configured to selectively activate and independently enable or selectively deactivate and independently disable each of the plurality of clocks depending on operations of the NVMe control unit among the fetching, the executing, the writing, and the transmitting, and
wherein the storage controller communicates with the external device, based on a nonvolatile memory express (NVMe) interface.

17. The storage device of claim 16, wherein the plurality of clocks include a first clock, a second clock, a third clock, and a fourth clock,
wherein the clock managing unit activates the first clock while the NVMe control unit fetches the command from the external device, activates the second clock while the NVMe control unit performs the corresponding operation, activates the third clock while the NVMe control unit writes the completion information to the external device, and activates the fourth clock while the NVMe control unit transmits the interrupt signal to the external device.

18. The storage device of claim 17, wherein the clock managing unit selectively activates or deactivates the first clock depending on an overhead of the external device, while the NVMe control unit fetches the command from the external device.

19. The storage device of claim 17, wherein the clock managing unit selectively activates or deactivates the third clock depending on an overhead of the external device or an overhead of the plurality of nonvolatile memory devices, while the NVMe control unit performs the corresponding operation.

* * * * *